US008048287B2

(12) United States Patent
Lee et al.

(10) Patent No.: US 8,048,287 B2
(45) Date of Patent: *Nov. 1, 2011

(54) METHOD FOR SELECTIVELY REMOVING CONDUCTIVE MATERIAL FROM A MICROELECTRONIC SUBSTRATE

(75) Inventors: Whonchee Lee, Boise, ID (US); Scott E. Moore, Nampa, ID (US); Scott G. Meikle, Gainesville, VA (US)

(73) Assignee: Round Rock Research, LLC, Mt Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/580,941

(22) Filed: Oct. 16, 2009

(65) Prior Publication Data

US 2010/0032314 A1    Feb. 11, 2010

Related U.S. Application Data

(60) Continuation of application No. 11/585,740, filed on Oct. 23, 2006, now Pat. No. 7,604,729, which is a division of application No. 10/230,973, filed on Aug. 29, 2002, now Pat. No. 7,153,195, which is a continuation-in-part of application No. 09/651,779, filed on Aug. 30, 2000, now Pat. No. 7,074,113, and a continuation-in-part of application No. 09/887,767, filed on Jun. 21, 2001, now Pat. No. 7,094,131, and a continuation-in-part of application No. 09/888,002, filed on Jun. 21, 2001, now Pat. No. 7,160,176, and a continuation-in-part of application No. 09/888,084, filed on Jun. 21, 2001, now Pat. No. 7,112,121.

(51) Int. Cl.
   *C25F 3/16* (2006.01)

(52) U.S. Cl. ......................... 205/668; 205/640

(58) Field of Classification Search .................. 205/640, 205/668

See application file for complete search history.

(56) References Cited

U.S. PATENT DOCUMENTS 2,315,695 A    4/1943   Faust (Continued)

FOREIGN PATENT DOCUMENTS

EP    0459397 A2    12/1991

(Continued)

OTHER PUBLICATIONS

Aboaf, J.A., et al., IBM Technical Disclosure Bulletin, Rounding of Square-Shape Holes in Silicon Wafers, vol. 19, No. 8, p. 3042, Jan. 1977, XP-002235690, NN 77013042.

(Continued)

*Primary Examiner* — Alexa D. Neckel
*Assistant Examiner* — Nicholas A. Smith
(74) *Attorney, Agent, or Firm* — Lerner, David, Littenberg, Krumholz & Mentlik, LLP

(57) ABSTRACT

Methods and apparatuses for selectively removing conductive materials from a microelectronic substrate. A method in accordance with an embodiment of the invention includes positioning the microelectronic substrate proximate to and spaced apart from an electrode pair that includes a first electrode and a second electrode spaced apart from the first electrode. An electrolytic liquid can be directed through a first flow passage to an interface region between the microelectronic substrate and the electrode pair. A varying electrical signal can be passed through the electrode pair and the electrolytic liquid to remove conductive material from the microelectronic substrate. The electrolytic liquid can be removed through a second flow passage proximate to the first flow passage and the electrode pair.

3 Claims, 12 Drawing Sheets

U.S. PATENT DOCUMENTS

| | | |
|---|---|---|
| 2,516,105 A | 7/1950 | der Mateosian |
| 3,239,439 A | 3/1966 | Helmke |
| 3,334,210 A | 8/1967 | Williams et al. |
| 4,613,417 A | 9/1986 | Laskowski et al. |
| 4,839,005 A | 6/1989 | Katsumoto et al. |
| 5,098,533 A | 3/1992 | Duke et al. |
| 5,162,248 A | 11/1992 | Dennison et al. |
| 5,244,534 A | 9/1993 | Yu et al. |
| 5,300,155 A | 4/1994 | Sandhu et al. |
| 5,344,539 A | 9/1994 | Shinogi et al. |
| 5,562,529 A | 10/1996 | Kishii et al. |
| 5,567,300 A | 10/1996 | Datta et al. |
| 5,575,885 A | 11/1996 | Hirabayashi et al. |
| 5,618,381 A | 4/1997 | Doan et al. |
| 5,624,300 A | 4/1997 | Kishii et al. |
| 5,676,587 A | 10/1997 | Landers et al. |
| 5,681,423 A | 10/1997 | Sandhu et al. |
| 5,780,358 A | 7/1998 | Zhou et al. |
| 5,800,248 A | 9/1998 | Pant et al. |
| 5,807,165 A | 9/1998 | Uzoh et al. |
| 5,840,629 A | 11/1998 | Carpio |
| 5,843,818 A | 12/1998 | Joo et al. |
| 5,846,398 A | 12/1998 | Carpio |
| 5,863,307 A | 1/1999 | Zhou et al. |
| 5,888,866 A | 3/1999 | Chien |
| 5,897,375 A | 4/1999 | Watts et al. |
| 5,911,619 A | 6/1999 | Uzoh et al. |
| 5,930,699 A | 7/1999 | Bhatia |
| 5,934,980 A | 8/1999 | Koos et al. |
| 5,952,687 A | 9/1999 | Kawakubo et al. |
| 5,954,975 A | 9/1999 | Cadien et al. |
| 5,954,997 A | 9/1999 | Kaufman et al. |
| 5,972,792 A | 10/1999 | Hudson |
| 5,993,637 A | 11/1999 | Hisamatsu et al. |
| 6,001,730 A | 12/1999 | Farkas et al. |
| 6,007,695 A | 12/1999 | Knall et al. |
| 6,010,964 A | 1/2000 | Glass |
| 6,024,856 A | 2/2000 | Haydu et al. |
| 6,033,953 A | 3/2000 | Aoki et al. |
| 6,039,633 A | 3/2000 | Chopra |
| 6,046,099 A | 4/2000 | Cadien et al. |
| 6,051,496 A | 4/2000 | Jang |
| 6,060,386 A | 5/2000 | Givens |
| 6,060,395 A | 5/2000 | Skrovan et al. |
| 6,063,306 A | 5/2000 | Kaufman et al. |
| 6,066,030 A | 5/2000 | Uzoh |
| 6,066,559 A | 5/2000 | Gonzalez et al. |
| 6,068,787 A | 5/2000 | Grumbine et al. |
| 6,077,412 A | 6/2000 | Ting et al. |
| 6,083,840 A | 7/2000 | Mravic et al. |
| 6,100,197 A | 8/2000 | Hasegawa |
| 6,103,096 A | 8/2000 | Datta et al. |
| 6,103,628 A | 8/2000 | Talieh |
| 6,103,636 A | 8/2000 | Zahorik et al. |
| 6,115,233 A | 9/2000 | Seliskar et al. |
| 6,117,781 A | 9/2000 | Lukanc et al. |
| 6,121,152 A | 9/2000 | Adams et al. |
| 6,132,586 A | 10/2000 | Adams et al. |
| 6,143,155 A | 11/2000 | Adams et al. |
| 6,162,681 A | 12/2000 | Wu |
| 6,171,467 B1 | 1/2001 | Weihs et al. |
| 6,174,425 B1 | 1/2001 | Simpson et al. |
| 6,176,992 B1 | 1/2001 | Talieh |
| 6,180,947 B1 | 1/2001 | Stickel et al. |
| 6,187,651 B1 | 2/2001 | Oh |
| 6,190,494 B1 | 2/2001 | Dow |
| 6,196,899 B1 | 3/2001 | Chopra et al. |
| 6,197,182 B1 | 3/2001 | Kaufman et al. |
| 6,206,756 B1 | 3/2001 | Chopra et al. |
| 6,218,309 B1 | 4/2001 | Miller et al. |
| 6,250,994 B1 | 6/2001 | Chopra et al. |
| 6,259,128 B1 | 7/2001 | Adler et al. |
| 6,273,786 B1 | 8/2001 | Chopra et al. |
| 6,276,996 B1 | 8/2001 | Chopra |
| 6,280,581 B1 | 8/2001 | Cheng |
| 6,287,974 B1 | 9/2001 | Miller |
| 6,299,741 B1 | 10/2001 | Sun et al. |
| 6,303,956 B1 | 10/2001 | Sandhu et al. |
| 6,313,038 B1 | 11/2001 | Chopra et al. |
| 6,322,422 B1 | 11/2001 | Satou |
| 6,328,632 B1 | 12/2001 | Chopra |
| 6,338,669 B1 | 1/2002 | Togawa et al. |
| 6,368,184 B1 | 4/2002 | Beckage |
| 6,368,190 B1 | 4/2002 | Easter et al. |
| 6,379,223 B1 | 4/2002 | Sun et al. |
| 6,395,152 B1 | 5/2002 | Wang |
| 6,395,607 B1 | 5/2002 | Chung |
| 6,416,647 B1 | 7/2002 | Dordi et al. |
| 6,495,005 B1 * | 12/2002 | Colgan et al. ............. 204/224 R |
| 6,693,036 B1 * | 2/2004 | Nogami et al. ............... 438/692 |
| 6,736,952 B2 * | 5/2004 | Emesh et al. ................... 205/81 |
| 6,846,227 B2 | 1/2005 | Sato et al. |
| 6,848,970 B2 | 2/2005 | Manens et al. |
| 6,852,630 B2 | 2/2005 | Basol et al. |
| 6,858,124 B2 | 2/2005 | Zazzera et al. |
| 6,867,136 B2 | 3/2005 | Basol et al. |
| 6,867,448 B1 | 3/2005 | Lee et al. |
| 6,881,664 B2 | 4/2005 | Catabay et al. |
| 6,884,338 B2 | 4/2005 | Kesari et al. |
| 6,893,328 B2 | 5/2005 | So |
| 6,899,804 B2 | 5/2005 | Duboust et al. |
| 6,951,599 B2 | 10/2005 | Yahalom et al. |
| 6,977,224 B2 | 12/2005 | Dubin et al. |
| 7,074,113 B1 | 7/2006 | Moore |
| 7,094,131 B2 | 8/2006 | Lee et al. |
| 7,112,121 B2 | 9/2006 | Lee et al. |
| 7,112,122 B2 | 9/2006 | Lee et al. |
| 7,153,400 B2 * | 12/2006 | Ravkin et al. ............. 204/224 R |
| 7,153,777 B2 | 12/2006 | Lee |
| 7,160,176 B2 | 1/2007 | Lee et al. |
| 7,229,535 B2 | 6/2007 | Wang et al. |
| 7,524,410 B2 | 4/2009 | Lee et al. |
| 7,566,391 B2 | 7/2009 | Lee et al. |
| 2001/0006245 A1 | 7/2001 | Yunogami et al. |
| 2001/0025976 A1 | 10/2001 | Lee |
| 2001/0035354 A1 | 11/2001 | Ashjaee et al. |
| 2001/0036746 A1 | 11/2001 | Sato et al. |
| 2002/0052126 A1 | 5/2002 | Lee et al. |
| 2002/0070126 A1 | 6/2002 | Sato et al. |
| 2002/0086487 A1 | 7/2002 | Chung |
| 2002/0104764 A1 | 8/2002 | Banerjee et al. |
| 2004/0259479 A1 | 12/2004 | Sevilla |
| 2005/0016861 A1 | 1/2005 | Laursen et al. |
| 2005/0056550 A1 | 3/2005 | Lee et al. |
| 2005/0133379 A1 | 6/2005 | Basol et al. |
| 2005/0173260 A1 | 8/2005 | Basol et al. |
| 2005/0178743 A1 | 8/2005 | Manens et al. |
| 2006/0163083 A1 | 7/2006 | Andricacos et al. |

FOREIGN PATENT DOCUMENTS

| | | |
|---|---|---|
| EP | 0527514 A1 | 2/1993 |
| EP | 1123956 A1 | 8/2001 |
| EP | 1386695 A2 | 2/2004 |
| EP | 1536919 A1 | 6/2005 |
| JP | 1241129 A | 9/1989 |
| JP | 6120182 A | 4/1994 |
| JP | 10335305 A | 12/1998 |
| JP | 11145273 A | 5/1999 |
| JP | 2000269318 A | 9/2000 |
| JP | 2001077117 A | 3/2001 |
| JP | 2002093758 A | 3/2002 |
| TW | 516471 | 1/2003 |
| WO | 0026443 A2 | 5/2000 |
| WO | 0028586 A2 | 5/2000 |
| WO | 0032356 A1 | 6/2000 |
| WO | 0059008 A2 | 10/2000 |
| WO | 0059682 A1 | 10/2000 |
| WO | 02064314 A1 | 8/2002 |
| WO | 02085570 A2 | 10/2002 |
| WO | 03028048 A2 | 4/2003 |
| WO | 03072672 A1 | 9/2003 |

OTHER PUBLICATIONS

ATMI, Inc., adapted from a presentation at the Semicon West '99 Low Dielectric Materials Technology Conference, San Francisco, California, Jul. 12, 1999, pp. 13-25.

Bassous, E., IBM Technical Disclosure Bulletin, Low Temperature Methods for Rounding Silicon Nozzles, vol. 20, No. 2, Jul. 1977, pp. 810-811, XP-002235692, NN 7707810.

Bernhardt, A.F.,et al., "Electrochemical Planarization for Multi-Level Metallization of Microcircuitry," CircuiTree, vol. 8, No. 10, pp. 38, 40, 42, 44, 46, and 48, Oct. 1995.

D'Heurle, F.M., et al., IBM Technical Disclosure Bulletin, Electrolytic Process for Metal Pattern Generation, vol. 17, No. 1, pp. 271-272, Jun. 1974, XP-002235691, NN 7406271.

Frankenthal, R.P., et al., "Electroetching of Platinum in the Titanium-Platinum-Gold Metallization Silicon Integrated Circuits," Journal of the Electrochemical Society, vol. 123, No. 5, pp. 703-706, May 1976, Pennington, New Jersey.

Huang, C.S. et al., "A Novel UV Baking Process to Improve DUV Photoresist Hardness," pp. 135-138, Proceedings of the 1999 International Symposium, VLSI Technology, Systems, and Applications: Proceedings of Technical Papers: Jun. 8-10, 1999, Taipei, Taiwan, Institute of Electrical and Electronics Engineers, Inc., Sep. 1999.

Juchniewicz, R. et al. "Influence of Pulsed Current Plantinised Titanium and Tantalum Anode Durability," International Congress Metallic Corrosion, Proceedings—vol. 3, pp. 449-453, Toronto, Jun. 3/7, 1984.

Kondo, S. et al., "Abrasive-Free Polishing for Copper Damascene Interconnection," Journal of the Electrochemical Society, vol. 147, No. 10, pp. 3907-3913, The Electrochemical Society, Inc., Pennington, New Jersey, 2000.

McGraw-Hill, "Chemical bonding," Concise Encyclopedia of Science & Technology, Fourth Edition, Sybil P. Parker, Editor in Chief, p. 367, McGraw-Hill, New York, 1998.

Micro Photonics, Inc. CSM Application Bulletin. Low-load Micro Scratch Tester (MST) for characterization of thin polymer films [online], 3 pages, retrieved from the Internet Jul. 25, 2002. <http://www.microphotonics.com/mstABpoly.html>.

Micro Photonics, Inc. CSM Nano Hardness Tester [online], 6 pages, retrieved from the Internet Jul. 29, 2002. <http://www.microphotonics.com/nht.html>.

PhysicsWorld. Hard Materials (excerpt of Superhard superlattices) [online], S. Barnett and A. Madan, Physics World, Jan. 1998, Institute of Physics Publishing Ltd., Bristol, United Kingdom, retrieved from the Internet, Jul. 29, 2002 <http://physicsweb.org/box/world/11/1/11/world-11-1-11-1>.

* cited by examiner

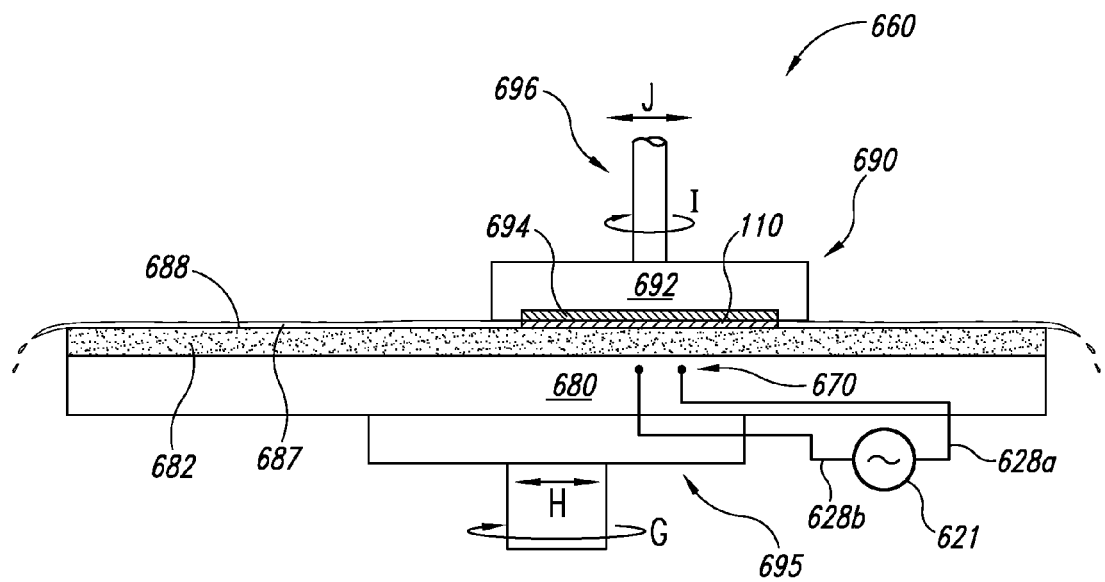
Fig. 11
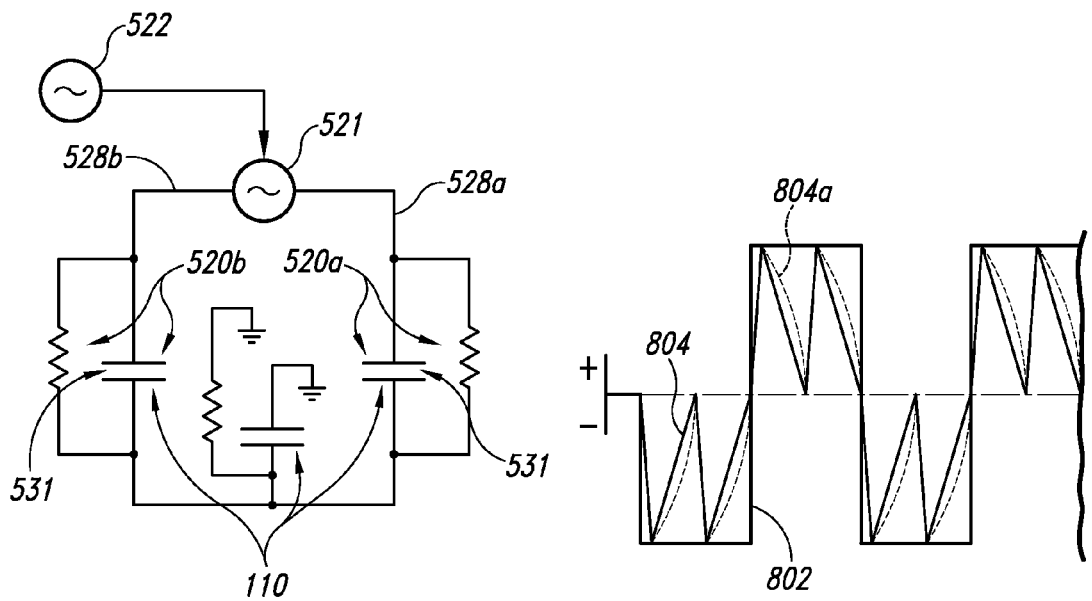
Fig. 12A
Fig. 12B

METHOD FOR SELECTIVELY REMOVING CONDUCTIVE MATERIAL FROM A MICROELECTRONIC SUBSTRATE

CROSS-REFERENCE TO RELATED APPLICATIONS

This application is a continuation of U.S. patent application Ser. No. 11/585,740 filed Oct. 23, 2006, now U.S. Pat. No. 7,604,729, which is a divisional of U.S. patent application Ser. No. 10/230,973 filed Aug. 29, 2002, now U.S. Pat. No. 7,153,195, both of which are incorporated herein by reference. U.S. patent application Ser. No. 10/230,973 is a continuation-in-part of the following U.S. patent applications, all of which are incorporated herein by reference: Ser. No. 09/651,779 filed Aug. 30, 2000, now U.S. Pat. No. 7,074,113; Ser. No. 09/888,084 filed Jun. 21, 2001, now U.S. Pat. No. 7,112,121; Ser. No. 09/887,767 filed Jun. 21, 2001, now U.S. Pat. No. 7,094,131; and Ser. No. 09/888,002 filed Jun. 21, 2001, now U.S. Pat. No. 7,160,176. Also incorporated herein by reference are the following U.S. patent applications, filed Aug. 29, 2002: Ser. No. 10/230,970, now U.S. Pat. No. 7,220,166; Ser. No. 10/230,972, now U.S. Pat. No. 7,134,934; Ser. No. 10/230,463, now U.S. Pat. No. 7,192,335; and Ser. No. 10/230,628, now U.S. Pat. No. 7,078,308.

TECHNICAL FIELD

This invention relates to methods and apparatuses for selectively removing conductive material from microelectronic substrates.

BACKGROUND

Microelectronic substrates and substrate assemblies typically include a semiconductor material having features, such as memory cells, that are linked with conductive lines. The conductive lines can be formed by first forming trenches or other recesses in the semiconductor material, and then overlaying a conductive material (such as a metal) in the trenches. The conductive material is then selectively removed to leave conductive lines extending from one feature in the semiconductor material to another.

Electrolytic techniques have been used to both deposit and remove metallic layers from semiconductor substrates. For example, an alternating current can be applied to a conductive layer via an intermediate electrolyte to remove portions of the layer. In one arrangement, shown in FIG. 1, a conventional apparatus 60 includes a first electrode 20a and a second electrode 20b coupled to a current source 21. The first electrode 20a is attached directly to a metallic layer 11 of a semiconductor substrate 10 and the second electrode 20b is at least partially immersed in a liquid electrolyte 31 disposed on the surface of the metallic layer 11 by moving the second electrode downwardly until it contacts the electrolyte 31. A barrier 22 protects the first electrode 20a from direct contact with the electrolyte 31. The current source 21 applies alternating current to the substrate 10 via the electrodes 20a and 20b and the electrolyte 31 to remove conductive material from the conductive layer 11. The alternating current signal can have a variety of wave forms, such as those disclosed by Frankenthal et al. in a publication entitled, "Electroetching of Platinum in the Titanium-Platinum-Gold Metallization on Silicon Integrated Circuits" (Bell Laboratories), incorporated herein in its entirety by reference.

One drawback with the arrangement shown in FIG. 1 is that it may not be possible to remove material from the conductive layer 11 in the region where the first electrode 20a is attached because the barrier 22 prevents the electrolyte 31 from contacting the substrate 10 in this region. Alternatively, if the first electrode 20a contacts the electrolyte in this region, the electrolytic process can degrade the first electrode 20a. Still a further drawback is that the electrolytic process may not uniformly remove material from the substrate 10. For example, "islands" of residual conductive material having no direct electrical connection to the first electrode 20a may develop in the conductive layer 11. The residual conductive material can interfere with the formation and/or operation of the conductive lines, and it may be difficult or impossible to remove with the electrolytic process unless the first electrode 20a is repositioned to be coupled to such "islands."

One approach to addressing some of the foregoing drawbacks is to attach a plurality of first electrodes 20a around the periphery of the substrate 10 to increase the uniformity with which the conductive material is removed. However, islands of conductive material may still remain despite the additional first electrodes 20a. Another approach is to form the electrodes 20a and 20b from an inert material, such as carbon, and remove the barrier 22 to increase the area of the conductive layer 11 in contact with the electrolyte 31. However, such inert electrodes may not be as effective as more reactive electrodes at removing the conductive material, and the inert electrodes may still leave residual conductive material on the substrate 10.

FIG. 2 shows still another approach to addressing some of the foregoing drawbacks in which two substrates 10 are partially immersed in a vessel 30 containing the electrolyte 31. The first electrode 20a is attached to one substrate 10 and the second electrode 20b is attached to the other substrate 10. An advantage of this approach is that the electrodes 20a and 20b do not contact the electrolyte. However, islands of conductive material may still remain after the electrolytic process is complete, and it may be difficult to remove conductive material from the points at which the electrodes 20a and 20b are attached to the substrates 10. Still another drawback with both the foregoing approaches is that it may be difficult to selectively remove conductive material from one portion of the microelectronic substrate without affecting the conductive material on other portions of the microelectronic substrate.

SUMMARY

The present invention is directed toward methods and apparatuses for selectively removing conductive materials from microelectronic substrates. A method in accordance with one aspect of the invention includes positioning a microelectronic substrate proximate to and spaced apart from an electrode pair that includes a first electrode and a second electrode spaced apart from the first electrode. The method can further include directing an electrolytic liquid through a first flow passage to an interface region between the microelectronic substrate and the electrode pair. A varying electrical signal can be passed through the electrode pair and the electrolytic liquid to remove conductive material from the microelectronic substrate, and the electrolytic liquid can be removed through a second flow passage proximate to the first flow passage and the electrode pair.

In further aspects of the invention, the electrolytic liquid can be generally inert when in contact with the microelectronic substrate in the absence of an electrical signal. A seal can be disposed at least proximate to the electrode pair to restrict a flow of the electrolytic liquid away from the electrode pair. The microelectronic substrate can be contacted with a polishing medium positioned proximate to the electrode pair, and at least one of the microelectronic substrate and the electrode pair can be moved relative to the other while the polishing medium contacts the microelectronic substrate.

A method in accordance with another aspect of the invention includes positioning a microelectronic substrate proximate to and spaced apart from an electrode pair, directing an electrolytic liquid through a first flow passage to a region between the microelectronic substrate and the electrode pair, and passing a varying electrical signal through the electrode pair and the electrolytic liquid to remove conductive material from the microelectronic substrate. The method can further include diluting the electrolytic liquid by passing a diluting liquid through a second flow passage proximate to the first flow passage and the electrode pair.

An apparatus in accordance with an aspect of the invention can include a carrier configured to removably carry a microelectronic substrate, and an electrode pair positioned proximate to the carrier. The electrode pair can include a first electrode and a second electrode spaced apart from the first electrode with at least one of the electrodes coupleable to a varying electrical signal transmitter. A first flow passage can be positioned proximate to the first and second electrodes, with the first flow passage being coupleable to a supply of electrolytic liquid. A second flow passage can be positioned proximate to the first flow passage and can have an aperture at least proximate to the electrode pair. The second flow passage can be coupleable to a vacuum source to remove the electrolytic liquid from a region proximate to the first and second electrodes, or the second flow passage can be coupleable to a source of diluting liquid.

BRIEF DESCRIPTION OF THE DRAWINGS

FIG. 11 is a partially schematic, side elevational view of an apparatus for both planarizing and electrolytically processing microelectronic substrates in accordance with still another embodiment of the invention.

FIGS. 12A-B schematically illustrate a circuit and wave form for electrolytically processing a microelectronic substrate in accordance with yet another embodiment of the invention.

DETAILED DESCRIPTION

The present disclosure describes methods and apparatuses for removing conductive materials from a microelectronic substrate and/or substrate assembly used in the fabrication of microelectronic devices. Many specific details of certain embodiments of the invention are set forth in the following description and in FIGS. 3-16 to provide a thorough understanding of these embodiments. One skilled in the art, however, will understand that the present invention may have additional embodiments, or that the invention may be practiced without several of the details described below.

Figure 3:
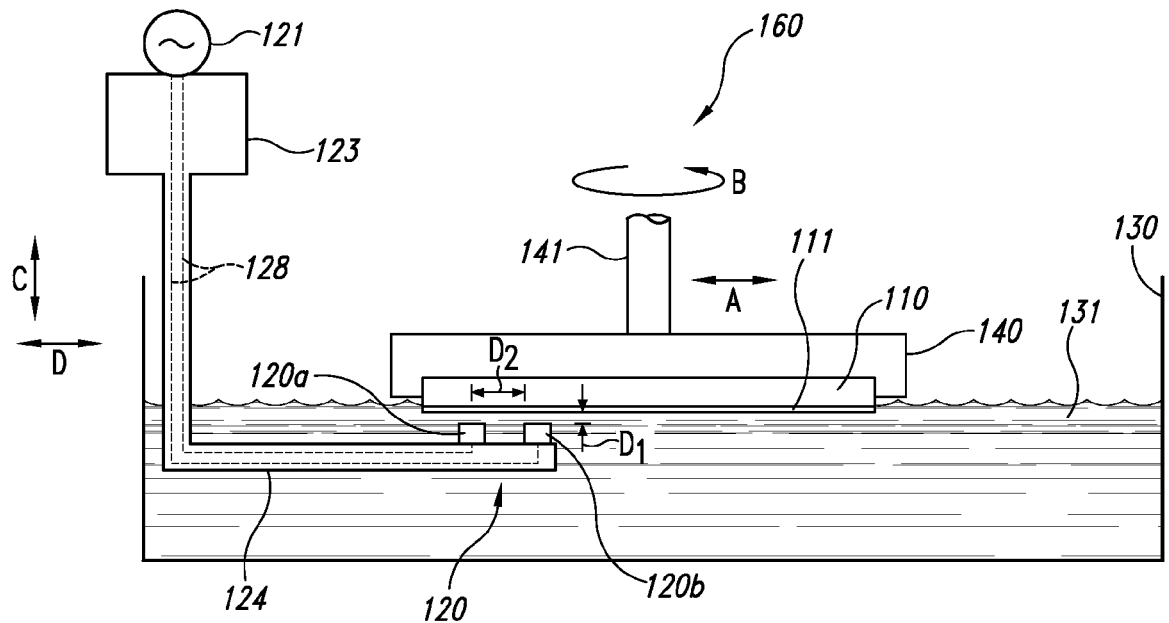
FIG. 3 is a partially schematic, side elevational view of an apparatus having a support member and a pair of electrodes for removing conductive material from a microelectronic substrate in accordance with an embodiment of the invention.

FIG. 3 is a partially schematic, side elevational view of an apparatus 160 for removing conductive material from a microelectronic substrate or substrate assembly 110 in accordance with an embodiment of the invention. In one aspect of this embodiment, the apparatus 160 includes a vessel 130 containing an electrolyte 131, which can be in a liquid or a gel state. A support member 140 supports the microelectronic substrate 110 relative to the vessel 130 so that a conductive layer 111 of the substrate 110 contacts the electrolyte 131. The conductive layer 111 can include metals such as platinum, tungsten, tantalum, gold, copper, or other conductive materials. In another aspect of this embodiment, the support member 140 is coupled to a substrate drive unit 141 that moves the support member 140 and the substrate 110 relative to the vessel 130. For example, the substrate drive unit 141 can translate the support member 140 (as indicated by arrow "A") and/or rotate the support member 140 (as indicated by arrow "B").

The apparatus 160 can further include a first electrode 120a and a second electrode 120b (referred to collectively as electrodes 120) supported relative to the microelectronic substrate 110 by a support arm 124. In one aspect of this embodiment, the support arm 124 is coupled to an electrode drive unit 123 for moving the electrodes 120 relative to the microelectronic substrate 110. For example, the electrode drive unit 123 can move the electrodes toward and away from the conductive layer 111 of the microelectronic substrate 110, (as indicated by arrow "C"), and/or transversely (as indicated by arrow "D") in a plane generally parallel to the conductive layer 111. Alternatively, the electrode drive unit 123 can move the electrodes in other fashions, or the electrode drive unit 123 can be eliminated when the substrate drive unit 141 provides sufficient relative motion between the substrate 110 and the electrodes 120.

In either embodiment described above with reference to FIG. 3, the electrodes 120 are coupled to a current source 121 with leads 128 for supplying electrical current to the electrolyte 131 and the conductive layer 111. In operation, the current source 121 supplies an alternating current (single phase or multiphase) to the electrodes 120. The current passes through the electrolyte 131 and reacts electrochemically with the conductive layer 111 to remove material (for example, atoms or groups of atoms) from the conductive layer 111. The electrodes 120 and/or the substrate 110 can be moved relative to each other to remove material from selected portions of the conductive layer 111, or from the entire conductive layer 111.

In one aspect of an embodiment of the apparatus 160 shown in FIG. 3, a distance $D_1$ between the electrodes 120 and the conductive layer 111 is set to be smaller than a distance $D_2$ between the first electrode 120a and the second electrode 120b. Furthermore, the electrolyte 131 generally has a higher resistance than the conductive layer 111. Accordingly, the alternating current follows the path of least resistance from the first electrode 120a, through the electrolyte 131 to the conductive layer 111 and back through the electrolyte 131 to the second electrode 120b, rather than from the first electrode 120a directly through the electrolyte 131 to the second electrode 120b. Alternatively, a low dielectric material (not shown) can be positioned between the first electrode 120a and the second electrode 120b to decouple direct electrical communication between the electrodes 120 that does not first pass through the conductive layer 111.

Figure 1:
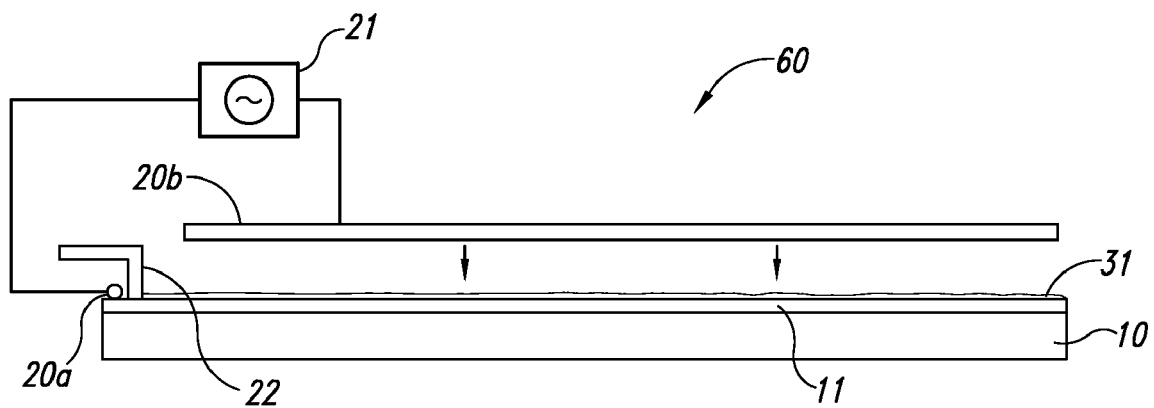
FIG. 1 is a partially schematic, side elevational view of an apparatus for removing conductive material from a semiconductor substrate in accordance with the prior art.
Figure 2:
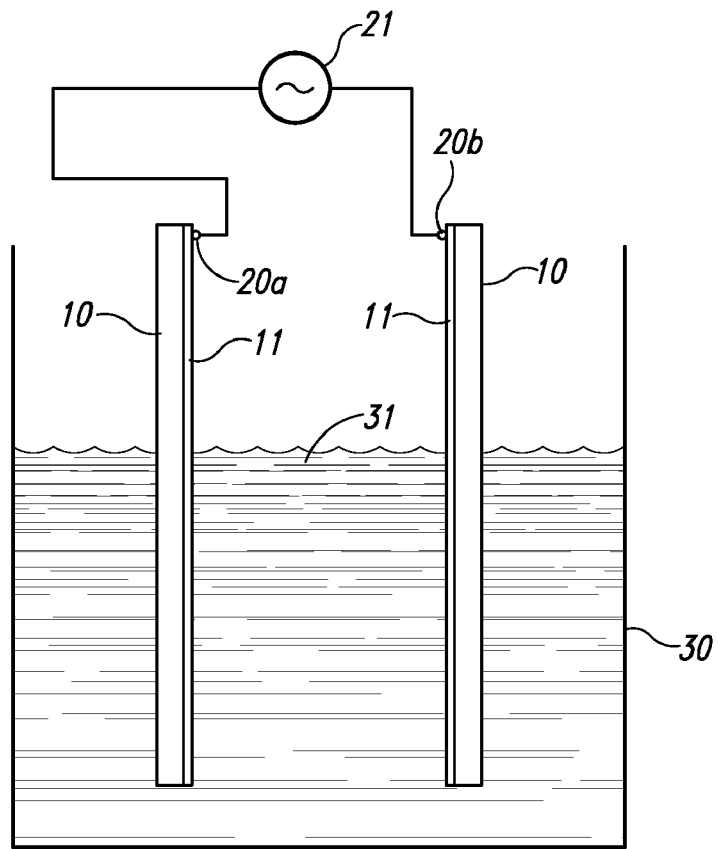
FIG. 2 is a partially schematic side, elevational view of another apparatus for removing conductive material from two semiconductor substrates in accordance with the prior art.

One feature of an embodiment of the apparatus 160 shown in FIG. 3 is that the electrodes 120 do not contact the conductive layer 111 of the substrate 110. An advantage of this arrangement is that it can eliminate the residual conductive material resulting from a direct electrical connection between the electrodes 120 and the conductive layer 111, described above with reference to FIGS. 1 and 2. For example, the apparatus 160 can eliminate residual conductive material adjacent to the contact region between the electrodes and the conductive layer because the electrodes 120 do not contact the conductive layer 111.

Another feature of an embodiment of the apparatus 160 described above with reference to FIG. 3 is that the substrate 110 and/or the electrodes 120 can move relative to the other to position the electrodes 120 at any point adjacent to the conductive layer 111. An advantage of this arrangement is that the electrodes 120 can be sequentially positioned adjacent to every portion of the conductive layer to remove material from the entire conductive layer 111. Alternatively, when it is desired to remove only selected portions of the conductive layer 111, the electrodes 120 can be moved to those selected portions, leaving the remaining portions of the conductive layer 111 intact.

Figure 4:
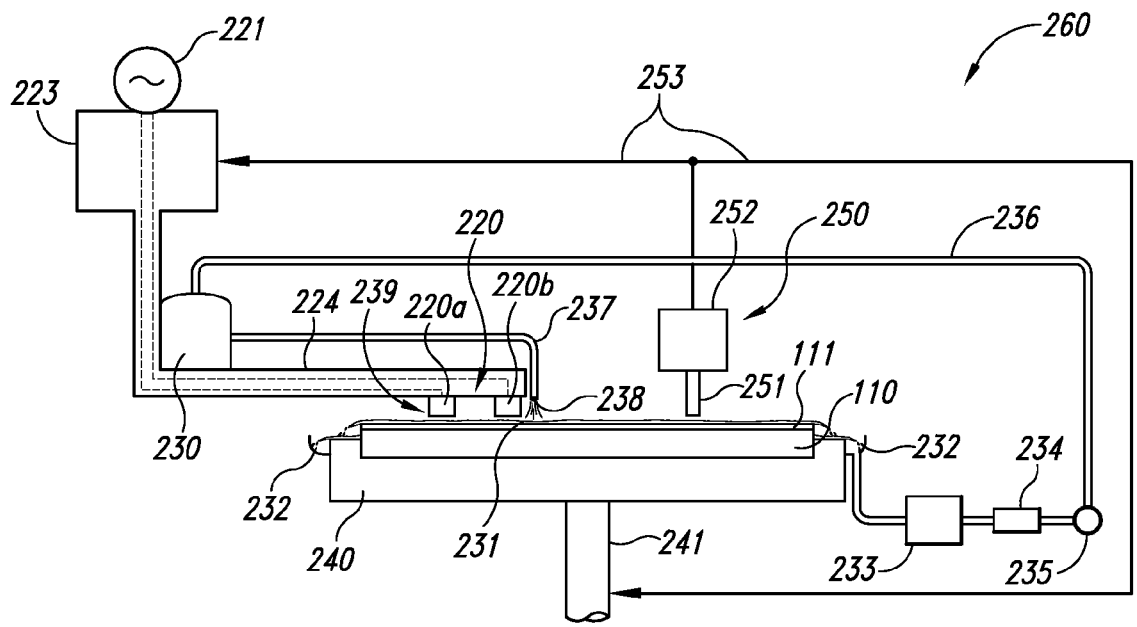
FIG. 4 is a partially schematic, side elevational view of an apparatus for removing conductive material and sensing characteristics of the microelectronic substrate from which the material is removed in accordance with another embodiment of the invention.

FIG. 4 is a partially schematic, side elevational view of an apparatus 260 that includes a support member 240 positioned to support the substrate 110 in accordance with another embodiment of the invention. In one aspect of this embodiment, the support member 240 supports the substrate 110 with the conductive layer 111 facing upwardly. A substrate drive unit 241 can move the support member 240 and the substrate 110, as described above with reference to FIG. 3. First and second electrodes 220a and 220b are positioned above the conductive layer 111 and are coupled to a current source 221. A support member 224 supports the electrodes 220 relative to the substrate 110 and is coupled to an electrode drive unit 223 to move the electrodes 220 over the surface of the support conductive layer 111 in a manner generally similar to that described above with reference to FIG. 3.

In one aspect of the embodiment shown in FIG. 4, the apparatus 260 further includes an electrolyte vessel 230 having a supply conduit 237 with an aperture 238 positioned proximate to the electrodes 220. Accordingly, an electrolyte 231 can be deposited locally in an interface region 239 between the electrodes 220 and the conductive layer 111, without necessarily covering the entire conductive layer 111. The electrolyte 231 and the conductive material removed from the conductive layer 111 flow over the substrate 110 and collect in an electrolyte receptacle 232. The mixture of electrolyte 231 and conductive material can flow to a reclaimer 233 that removes most of the conductive material from the electrolyte 231. A filter 234 positioned downstream of the reclaimer 233 provides additional filtration of the electrolyte 231 and a pump 235 returns the reconditioned electrolyte 231 to the electrolyte vessel 230 via a return line 236. Apparatuses for locally removing conductive material in accordance with other embodiments of the invention are described with reference to FIGS. 13A-16.

In another aspect of the embodiment shown in FIG. 4, the apparatus 260 can include a sensor assembly 250 having a sensor 251 positioned proximate to the conductive layer 111, and a sensor control unit 252 coupled to the sensor 251 for processing signals generated by the sensor 251. The control unit 252 can also move the sensor 251 relative to the substrate 110. In a further aspect of this embodiment, the sensor assembly 250 can be coupled via a feedback path 253 to the electrode drive unit 223 and/or the substrate drive unit 241. Accordingly, the sensor 251 can determine which areas of the conductive layer 111 require additional material removal and can move the electrodes 220 and/or the substrate 110 relative to each other to position the electrodes 220 over those areas. Alternatively, (for example, when the removal process is highly repeatable), the electrodes 220 and/or the substrate 110 can move relative to each other according to a pre-determined motion schedule.

The sensor 251 and the sensor control unit 252 can have any of a number of suitable configurations. For example, in one embodiment, the sensor 251 can be an optical sensor that detects removal of the conductive layer 111 by detecting a change in the intensity, wavelength or phase shift of the light reflected from the substrate 110 when the conductive material is removed. Alternatively, the sensor 251 can emit and detect reflections of radiation having other wavelengths, for example, x-ray radiation. In still another embodiment, the sensor 251 can measure a change in resistance or capacitance of the conductive layer 111 between two selected points. In a further aspect of this embodiment, one or both of the electrodes 220 can perform the function of the sensor 251 (as well as the material removal function described above), eliminating the need for a separate sensor 251. In still further embodiments, the sensor 251 can detect a change in the voltage and/or current drawn from the current supply 221 as the conductive layer 111 is removed.

In any of the embodiments described above with reference to FIG. 4, the sensor 251 can be positioned apart from the electrolyte 231 because the electrolyte 231 is concentrated in the interface region 239 between the electrodes 220 and the conductive layer 111. Accordingly, the accuracy with which the sensor 251 determines the progress of the electrolytic process can be improved because the electrolyte 231 will be less likely to interfere with the operation of the sensor 251. For example, when the sensor 251 is an optical sensor, the electrolyte 231 will be less likely to distort the radiation reflected from the surface of the substrate 110 because the sensor 251 is positioned away from the interface region 239.

Another feature of an embodiment of the apparatus 260 described above with reference to FIG. 4 is that the electrolyte 231 supplied to the interface region 239 is continually replenished, either with a reconditioned electrolyte or a fresh electrolyte. An advantage of this feature is that the electrochemical reaction between the electrodes 220 and the conductive layer 111 can be maintained at a high and consistent level.

Figure 5:
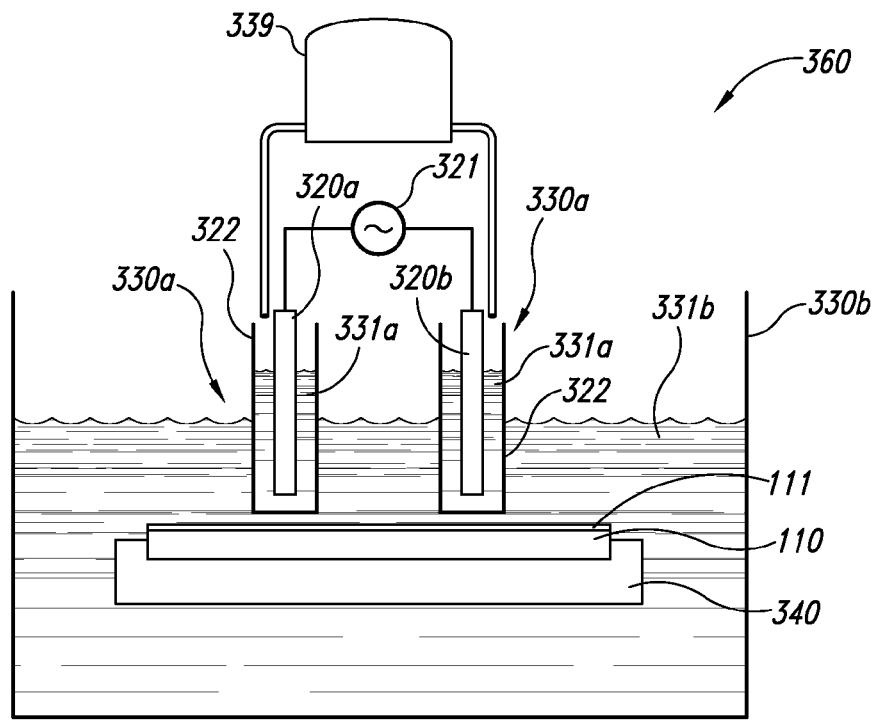
FIG. 5 is a partially schematic, side elevational view of an apparatus that includes two electrolytes in accordance with still another embodiment of the invention.

FIG. 5 is a partially schematic, side elevational view of an apparatus 360 that directs alternating current to the substrate 110 through a first electrolyte 331a and a second electrolyte 331b. In one aspect of this embodiment, the first electrolyte 331a is disposed in two first electrolyte vessels 330a, and the second electrolyte 331b is disposed in a second electrolyte vessel 330b. The first electrolyte vessels 330a are partially submerged in the second electrolyte 331b. The apparatus 360 can further include electrodes 320, shown as a first electrode 320a and a second electrode 320b, each coupled to a current supply 321 and each housed in one of the first electrolyte vessels 330a. Alternatively, one of the electrodes 320 can be coupled to ground. The electrodes 320 can include materials such as silver, platinum, copper and/or other materials, and the first electrolyte 331a can include sodium chloride, potassium chloride, copper sulfate and/or other electrolytes that are compatible with the material forming the electrodes 320.

In one aspect of this embodiment, the first electrolyte vessels 330a include a flow restrictor 322, such as a permeable isolation membrane formed from Teflon™, sintered materials such as sintered glass, quartz or sapphire, or other suitable porous materials that allow ions to pass back and forth between the first electrolyte vessels 330a and the second electrolyte vessel 330b, but do not allow the second electrolyte 330b to pass inwardly toward the electrodes 320 (for example, in a manner generally similar to a salt bridge). Alternatively, the first electrolyte 331a can be supplied to the electrode vessels 330a from a first electrolyte source 339 at a pressure and rate sufficient to direct the first electrolyte 331a outwardly through the flow restrictor 322 without allowing the first electrolyte 331a or the second electrolyte 330b to return through the flow restrictor 322. In either embodiment, the second electrolyte 331b remains electrically coupled to the electrodes 320 by the flow of the first electrolyte 331a through the restrictor 322.

In one aspect of this embodiment, the apparatus 360 can also include a support member 340 that supports the substrate 110 with the conductive layer 111 facing toward the electrodes 320. For example, the support member 340 can be positioned in the second electrolyte vessel 330b. In a further aspect of this embodiment, the support member 340 and/or the electrodes 320 can be movable relative to each other by one or more drive units (not shown).

One feature of an embodiment of the apparatus 360 described above with reference to FIG. 5 is that the first electrolyte 331a can be selected to be compatible with the electrodes 320. An advantage of this feature is that the first electrolyte 331a can be less likely than conventional electrolytes to degrade the electrodes 320. Conversely, the second electrolyte 331b can be selected without regard to the effect it has on the electrodes 320 because it is chemically isolated from the electrodes 320 by the flow restrictor 322. Accordingly, the second electrolyte 331b can include hydrochloric acid or another agent that reacts aggressively with the conductive layer 111 of the substrate 110.

Figure 6:
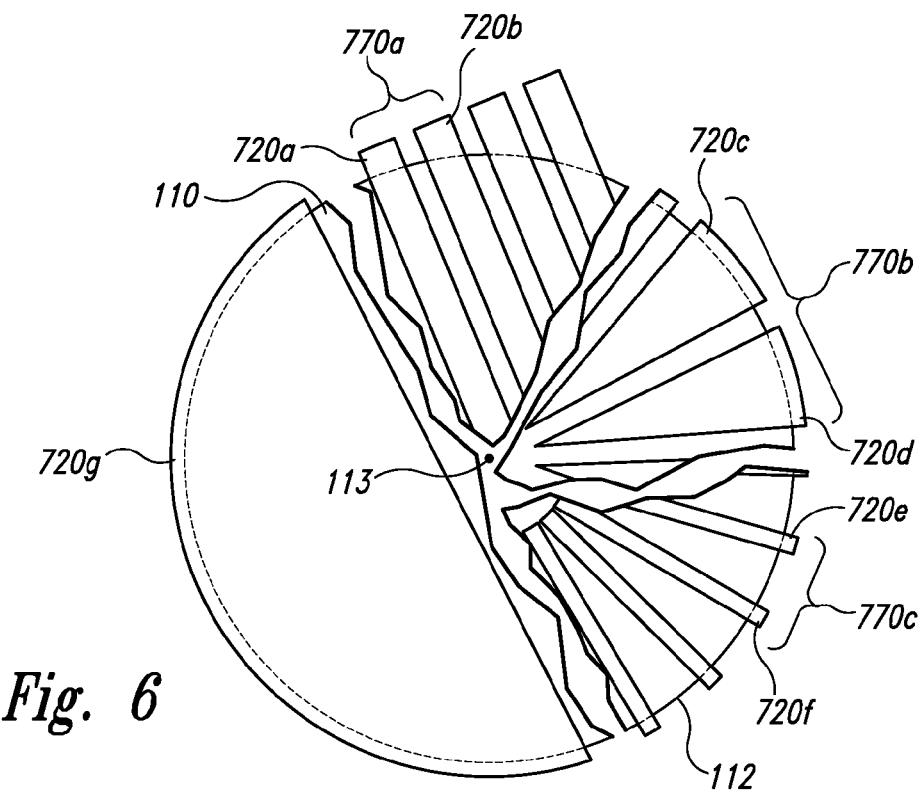
FIG. 6 is a partially schematic, plan view of a substrate adjacent to a plurality of electrodes in accordance with still further embodiments of the invention.

FIG. 6 is a top plan view of the microelectronic substrate 110 positioned beneath a plurality of electrodes having shapes and configurations in accordance with several embodiments of the invention. For purposes of illustration, several different types of electrodes are shown positioned proximate to the same microelectronic substrate 110; however, in practice, electrodes of the same type can be positioned relative to a single microelectronic substrate 110.

In one embodiment, electrodes 720a and 720b can be grouped to form an electrode pair 770a, with each electrode 720a and 720b coupled to an opposite terminal of a current supply 121 (FIG. 3). The electrodes 770a and 770b can have an elongated or strip-type shape and can be arranged to extend parallel to each other over the diameter of the substrate 110. The spacing between adjacent electrodes of an electrode pair 370a can be selected to direct the electrical current into the substrate 110, as described above with reference to FIG. 3.

In an alternate embodiment, electrodes 720c and 720d can be grouped to form an electrode pair 770b, and each electrode 720c and 720d can have a wedge or "pie" shape that tapers inwardly toward the center of the microelectronic substrate 110. In still another embodiment, narrow, strip-type electrodes 720e and 720f can be grouped to form electrode pairs 770c, with each electrode 720e and 720f extending radially outwardly from the center 113 of the microelectronic substrate 110 toward the periphery 112 of the microelectronic substrate 110.

In still another embodiment, a single electrode 720g can extend over approximately half the area of the microelectronic substrate 110 and can have a semicircular planform shape. The electrode 720g can be grouped with another electrode (not shown) having a shape corresponding to a mirror image of the electrode 720g, and both electrodes can be coupled to the current source 121 to provide alternating current to the microelectronic substrate in any of the manners described above with reference to FIGS. 3-5.

Figure 7:
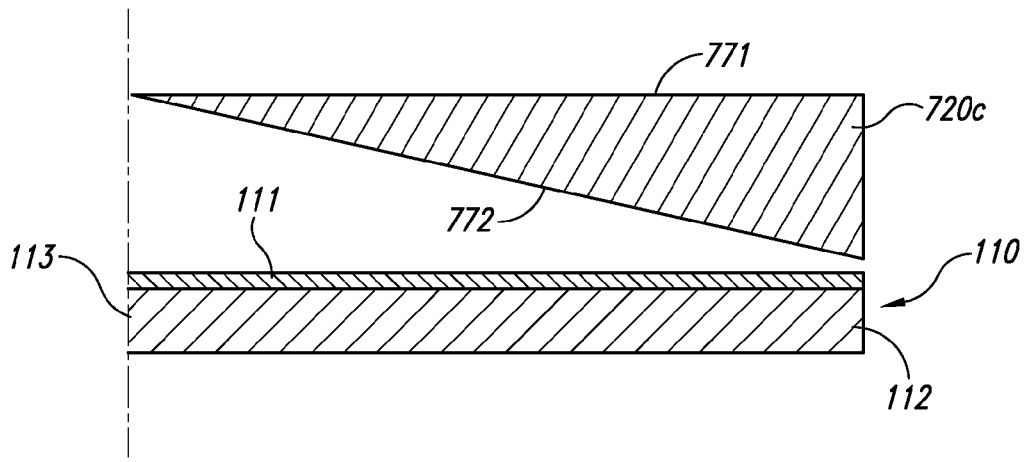
FIG. 7 is a cross-sectional, side elevational view of an electrode and a substrate in accordance with yet another embodiment of the invention.

FIG. 7 is a partially schematic, cross-sectional side elevational view of a portion of the substrate 110 positioned beneath the electrode 720c described above with reference to FIG. 6. In one aspect of this embodiment, the electrode 720c has an upper surface 771 and a lower surface 772 opposite the upper surface 771 and facing the conductive layer 111 of the substrate 110. The lower surface 772 can taper downwardly from the center 113 of the substrate 110 toward the perimeter 112 of the substrate 110 in one aspect of this embodiment to give the electrode 720c a wedge-shaped profile. Alternatively, the electrode 720c can have a plate-type configuration with the lower surface 772 positioned as shown in FIG. 7 and the upper surface 771 parallel to the lower surface 772. One feature of either embodiment is that the electrical coupling between the electrode 720c and the substrate 110 can be stronger toward the periphery 112 of the substrate 110 than toward the center 113 of the substrate 110. This feature can be advantageous when the periphery 112 of the substrate 110 moves relative to the electrode 720c at a faster rate than does the center 113 of the substrate 110, for example, when the substrate 110 rotates about its center 113. Accordingly, the electrode 720c can be shaped to account for relative motion between the electrode and the substrate 110.

In other embodiments, the electrode 720c can have other shapes. For example, the lower surface 772 can have a curved rather than a flat profile. Alternatively, any of the electrodes described above with reference to FIG. 6 (or other electrodes having shapes other than those shown in FIG. 6) can have a sloped or curved lower surface. In still further embodiments, the electrodes can have other shapes that account for relative motion between the electrodes and the substrate 110.

Figure 8A:
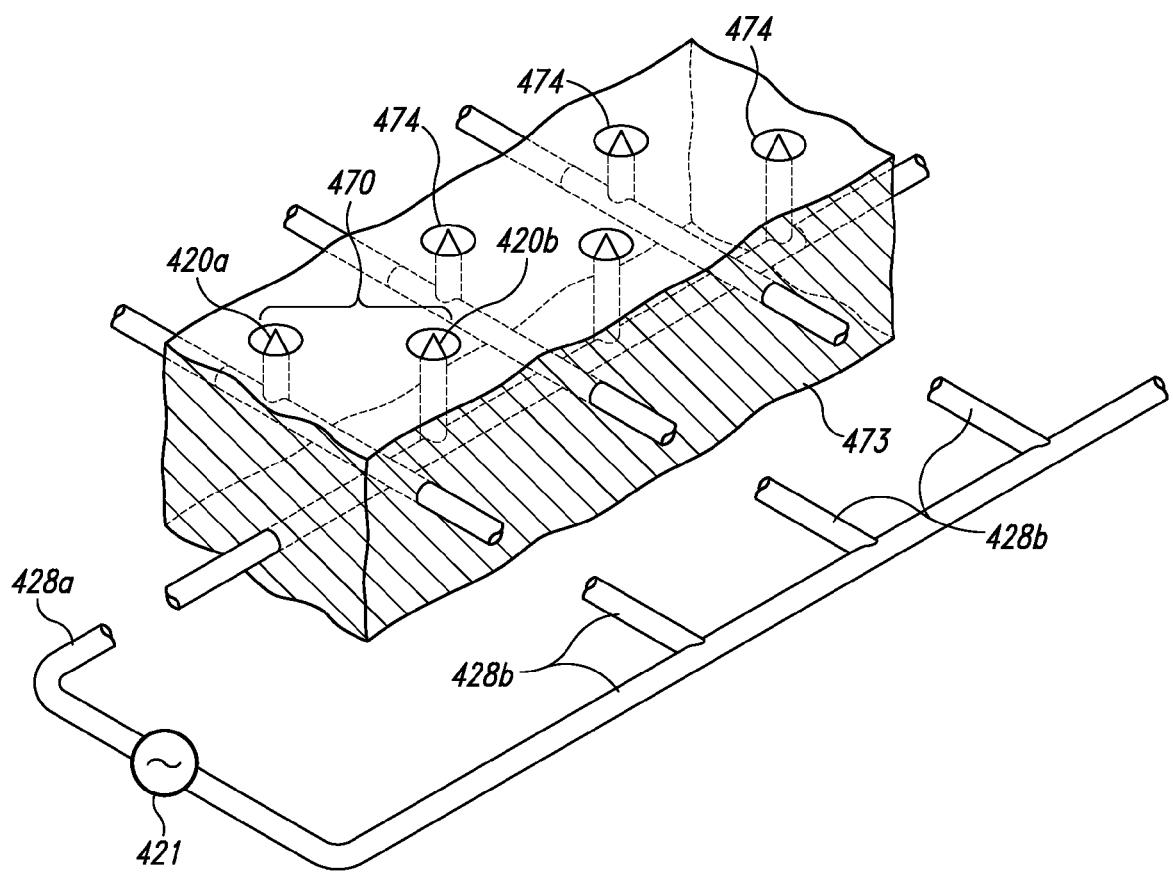
FIG. 8A is a partially schematic, isometric view of a portion of a support for housing electrode pairs in accordance with still another embodiment of the invention.

FIG. 8A is a partially schematic view of an electrode support 473 for supporting a plurality of electrodes in accordance with another embodiment of the invention. In one aspect of this embodiment, the electrode support 473 can include a plurality of electrode apertures 474, each of which houses either a first electrode 420a or a second electrode 420b. The first electrodes 420a are coupled through the apertures 474 to a first lead 428a and the second electrodes 420b are coupled to a second lead 428b. Both of the leads 428a and 428b are coupled to a current supply 421. Accordingly, each pair 470 of first and second electrodes 420a and 420b defines part of a circuit that is completed by the substrate 110 and the electrolyte(s) described above with reference to FIGS. 3-5.

In one aspect of this embodiment, the first lead 428a can be offset from the second lead 428b to reduce the likelihood for short circuits and/or capacitive coupling between the leads. In a further aspect of this embodiment, the electrode support 473 can have a configuration generally similar to any of those described above with reference to FIGS. 1-7. For example, any of the individual electrodes (e.g., 320a, 320c, 320e, or 320g) described above with reference to FIG. 6 can be replaced with an electrode support 473 having the same overall shape and including a plurality of apertures 474, each of which houses one of the first electrodes 420a or the second electrodes 420b.

In still a further aspect of this embodiment, the electrode pairs 470 shown in FIG. 8A can be arranged in a manner that corresponds to the proximity between the electrodes 420a, 420b and the microelectronic substrate 110 (FIG. 7), and/or the electrode pairs 470 can be arranged to correspond to the rate of relative motion between the electrodes 420a, 420b and the microelectronic substrate 110. For example, the electrode pairs 470 can be more heavily concentrated in the periphery 112 of the substrate 110 or other regions where the relative velocity between the electrode pairs 470 and the substrate 110 is relatively high (see FIG. 7). Accordingly, the increased concentration of electrode pairs 470 can provide an increased electrolytic current to compensate for the high relative velocity. Furthermore, the first electrode 420a and the second electrode 420b of each electrode pair 470 can be relatively close together in regions (such as the periphery 112 of the substrate 110) where the electrodes are close to the conductive layer 111 (see FIG. 7) because the close proximity to the conductive layer 111 reduces the likelihood for direct electrical coupling between the first electrode 420a and the second electrode 420b. In still a further aspect of this embodiment, the amplitude, frequency and/or waveform shape supplied to different electrode pairs 470 can vary depending on factors such as the spacing between the electrode pair 470 and the microelectronic substrate 110, and the relative velocity between the electrode pair 470 and the microelectronic substrate 110.

Figure 8B:
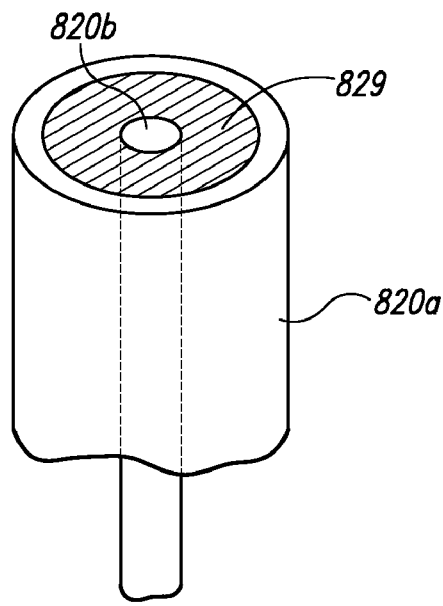
FIGS. 8B-8C are isometric views of electrodes in accordance with still further embodiments of the invention.
Figure 8C:
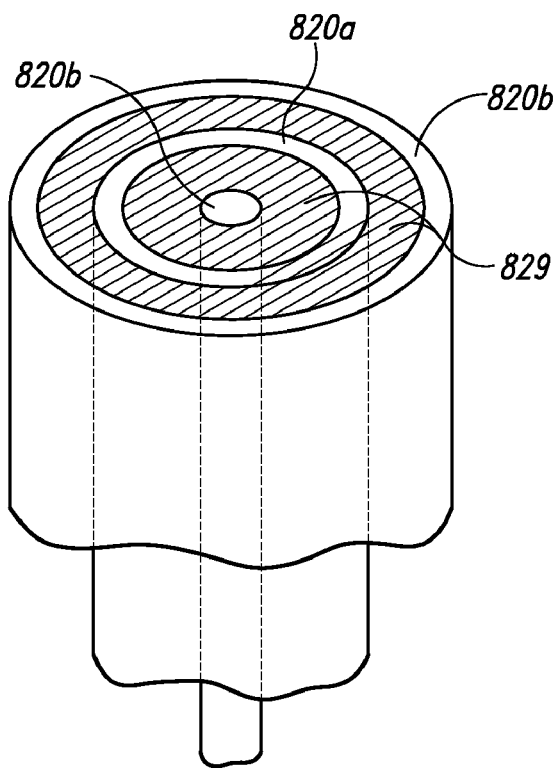

FIGS. 8B-8C illustrate electrodes 820 (shown as first electrodes 820a and second electrodes 820b) arranged concentrically in accordance with still further embodiments of the invention. In one embodiment shown in FIG. 8B, the first electrode 820a can be positioned concentrically around the second electrode 820b, and a dielectric material 829 can be disposed between the first electrode 820a and the second electrode 820b. The first electrode 820a can define a complete 360° arc around the second electrode 820b, as shown in FIG. 8B, or alternatively, the first electrode 820a can define an arc of less than 360°.

In another embodiment, shown in FIG. 8C, the first electrode 820A can be concentrically disposed between two second electrodes 820b, with the dielectric material 829 disposed between neighboring electrodes 820. In one aspect of this embodiment, current can be supplied to each of the second electrodes 820b with no phase shifting. Alternatively, the current supplied to one second electrode 820b can be phase-shifted relative to the current supplied to the other second electrode 820b. In a further aspect of the embodiment, the current supplied to each second electrode 820b can differ in characteristics other than phase, for example, amplitude.

One feature of the electrodes 820 described above with respect to FIGS. 8B-8C is that the first electrode 820a can shield the second electrode(s) 820b from interference from other current sources. For example, the first electrode 820a can be coupled to ground to shield the second electrodes 820b. An advantage of this arrangement is that the current applied to the substrate 110 (FIG. 7) via the electrodes 820 can be more accurately controlled.

Figure 9:
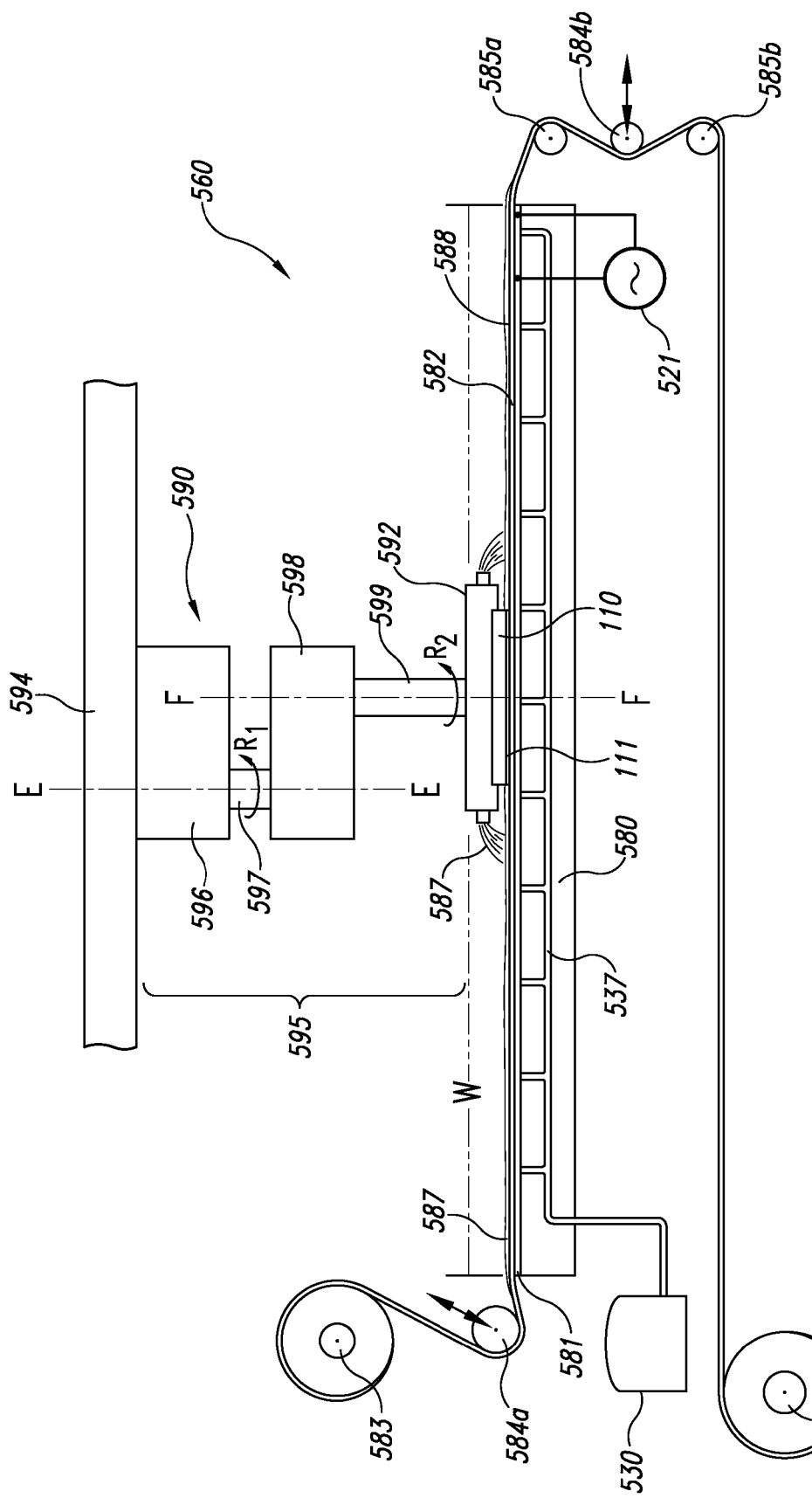
FIG. 9 is a partially schematic, side elevational view of an apparatus for both planarizing and electrolytically processing microelectronic substrates in accordance with yet another embodiment of the invention.

FIG. 9 schematically illustrates an apparatus 560 for both planarizing and electrolytically processing the microelectronic substrate 110 in accordance with an embodiment of the invention. In one aspect of this embodiment, the apparatus 560 has a support table 580 with a top-panel 581 at a workstation where an operative portion "W" of a planarizing pad 582 is positioned. The top-panel 581 is generally a rigid plate to provide a flat, solid surface to which a particular section of the planarizing pad 582 may be secured during planarization.

The apparatus 560 can also have a plurality of rollers to guide, position and hold the planarizing pad 582 over the top-panel 581. The rollers can include a supply roller 583, first and second idler rollers 584a and 584b, first and second guide rollers 585a and 585b, and a take-up roller 586. The supply roller 583 carries an unused or pre-operative portion of the planarizing pad 582, and the take-up roller 583 carries a used or post-operative portion of the planarizing pad 582. Additionally, the first idler roller 584a and the first guide roller 585a can stretch the planarizing pad 582 over the top-panel 581 to hold the planarizing pad 582 stationary during operation. A motor (not shown) drives at least one of the supply roller 583 and the take-up roller 586 to sequentially advance the planarizing pad 582 across the top-panel 581. Accordingly, clean pre-operative sections of the planarizing pad 582 may be quickly substituted for used sections to provide a consistent surface for planarizing and/or cleaning the substrate 110.

The apparatus 560 can also have a carrier assembly 590 that controls and protects the substrate 110 during planarization. The carrier assembly 590 can include a substrate holder 592 to pick up, hold and release the substrate 110 at appropriate stages of the planarizing process. The carrier assembly 590 can also have a support gantry 594 carrying a drive assembly 595 that can translate along the gantry 594. The drive assembly 595 can have an actuator 596, a drive shaft 597 coupled to the actuator 596, and an arm 598 projecting from the drive shaft 597. The arm 598 carries the substrate holder 592 via a terminal shaft 599 such that the drive assembly 595 orbits the substrate holder 592 about an axis E-E (as indicated by arrow "$R_1$"). The terminal shaft 599 may also rotate the substrate holder 592 about its central axis F-F (as indicated by arrow "$R_2$").

The planarizing pad 582 and a planarizing solution 587 define a planarizing medium that mechanically and/or chemically-mechanically removes material from the surface of the substrate 110. The planarizing pad 582 used in the apparatus 560 can be a fixed-abrasive planarizing pad in which abrasive particles are fixedly bonded to a suspension medium. Accordingly, the planarizing solution 587 can be a "clean solution" without abrasive particles because the abrasive particles are fixedly distributed across a planarizing surface 588 of the planarizing pad 582. In other applications, the planarizing pad 582 may be a non-abrasive pad without abrasive particles, and the planarizing solution 587 can be a slurry with abrasive particles and chemicals to remove material from the substrate 110.

To planarize the substrate 110 with the apparatus 560, the carrier assembly 590 presses the substrate 110 against the planarizing surface 588 of the planarizing pad 582 in the presence of the planarizing solution 587. The drive assembly 595 then orbits the substrate holder 592 about the axis E-E and optionally rotates the substrate holder 592 about the axis F-F to translate the substrate 110 across the planarizing surface 588. As a result, the abrasive particles and/or the chemicals in the planarizing medium remove material from the surface of the substrate 110 in a chemical and/or chemical-mechanical planarization (CMP) process. Accordingly, the planarizing pad 582 can smooth the substrate 110 by removing rough features projecting from the conductive layer 111 of the substrate 110.

In a further aspect of this embodiment, the apparatus 560 can include an electrolyte supply vessel 530 that delivers an electrolyte to the planarizing surface of the planarizing pad 582 with a conduit 537, as described in greater detail with reference to FIG. 10. The apparatus 560 can further include a current supply 521 coupled to the support table 580 and/or the top-panel 581 to supply an electrical current to electrodes positioned in the support table 580 and/or the top-panel 581. Accordingly, the apparatus 560 can electrolytically remove material from the conductive layer 111 in a manner similar to that described above with reference to FIGS. 1-8C.

In one aspect of an embodiment of the apparatus 560 described above with reference to FIG. 9, material can be sequentially removed from the conductive layer 111 of the substrate 110 first by an electrolytic process and then by a CMP process. For example, the electrolytic process can remove material from the conductive layer 111 in a manner that roughens the conductive layer 111. After a selected period of electrolytic processing time has elapsed, the electrolytic processing operation can be halted and additional material can be removed via CMP processing. Alternatively, the electrolytic process and the CMP process can be conducted simultaneously. In either of these processing arrangements, one feature of an embodiment of the apparatus 560 described above with reference to FIG. 9 is that the same apparatus 560 can planarize the substrate 110 via CMP and remove material from the substrate 110 via an electrolytic process. An advantage of this arrangement is that the substrate 110 need not be moved from one apparatus to another to undergo both CMP and electrolytic processing.

Another advantage of an embodiment of the apparatus 560 described above with reference to FIG. 9 is that the processes, when used in conjunction with each other, are expected to remove material from the substrate 110 more quickly and accurately than some conventional processes. For example, as described above, the electrolytic process can remove relatively large amounts of material in a manner that roughens the microelectronic substrate 110, and the planarizing process can remove material on a finer scale in a manner that smoothes and/or flattens the microelectronic substrate 110.

Figure 10:
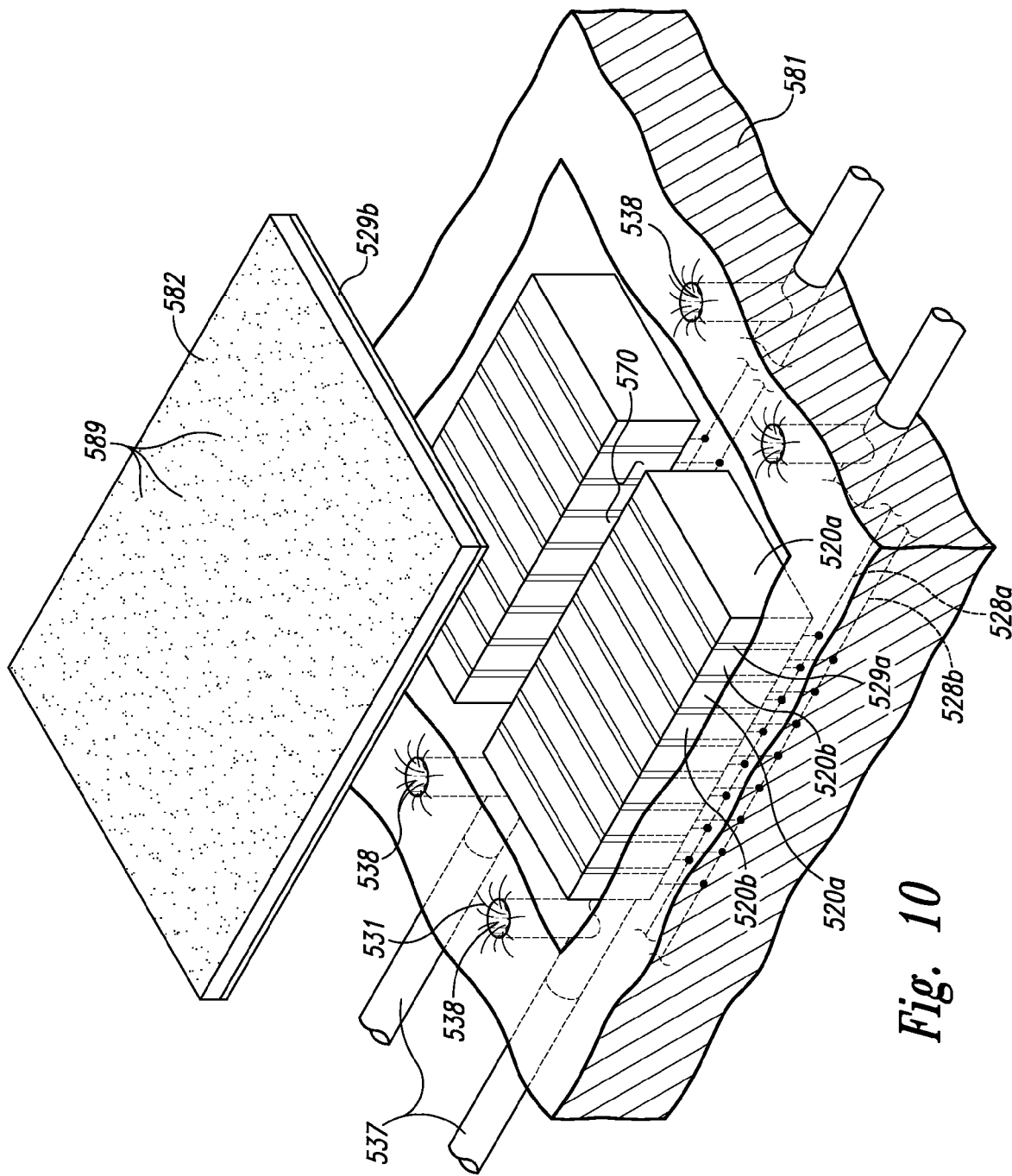
FIG. 10 is a partially schematic, partially exploded isometric view of a planarizing pad and a plurality of electrodes in accordance with still another embodiment of the invention.

FIG. 10 is a partially exploded, partially schematic isometric view of a portion of the apparatus 560 described above with reference to FIG. 9. In one aspect of an embodiment shown in FIG. 10, the top-panel 581 houses a plurality of electrode pairs 570, each of which includes a first electrode 520*a* and a second electrode 520*b*. The first electrodes 520*a* are coupled to a first lead 528*a* and the second electrodes 520*b* are coupled to a second lead 528*b*. The first and second leads 528*a* and 528*b* are coupled to the current source 521 (FIG. 9). In one aspect of this embodiment, the first electrode 520*a* can be separated from the second electrodes 520*b* by an electrode dielectric layer 529*a* that includes Teflon™ or another suitable dielectric material. The electrode dielectric layer 529*a* can accordingly control the volume and dielectric constant of the region between the first and second electrodes 520*a* and 520*b* to control electrical coupling between the electrodes.

The electrodes 520*a* and 520*b* can be electrically coupled to the microelectronic substrate 110 (FIG. 9) by the planarizing pad 582. In one aspect of this embodiment, the planarizing pad 582 is saturated with an electrolyte 531 supplied by the supply conduits 537 through apertures 538 in the top-panel 581 just beneath the planarizing pad 582. Accordingly, the electrodes 520*a* and 520*b* are selected to be compatible with the electrolyte 531. In an alternate arrangement, the electrolyte 531 can be supplied to the planarizing pad 582 from above (for example, by disposing the electrolyte 531 in the planarizing liquid 587) rather than through the top-panel 581. Accordingly, the planarizing pad 582 can include a pad dielectric layer 529*b* positioned between the planarizing pad 582 and the electrodes 520*a* and 520*b*. When the pad dielectric layer 529*b* is in place, the electrodes 520*a* and 520*b* are isolated from physical contact with the electrolyte 531 and can accordingly be selected from materials that are not necessarily compatible with the electrolyte 531.

In either of the embodiments described above with reference to FIG. 10, the planarizing pad 582 can provide several advantages over some conventional electrolytic arrangements. For example, the planarizing pad 582 can uniformly separate the electrodes 520*a* and 520*b* from the microelectronic substrate 110 (FIG. 9), which can increase the uniformity with which the electrolytic process removes material from the conductive layer 111 (FIG. 9). The planarizing pad 582 can also have abrasive particles 589 for planarizing the microelectronic substrate 110 in the manner described above with reference to FIG. 9. Furthermore, the planarizing pad 582 can filter carbon or other material that erodes from the electrodes 520*a* and 520*b* to prevent the electrode material from contacting the microelectronic substrate 110. Still further, the planarizing pad 582 can act as a sponge to retain the electrolyte 531 in close proximity to the microelectronic substrate 110.

FIG. 11 is a partially schematic, cross-sectional side elevational view of a rotary apparatus 660 for planarizing and/or electrolytically processing the microelectronic substrate 110 in accordance with another embodiment of the invention. In one aspect of this embodiment, the apparatus 660 has a generally circular platen or table 680, a carrier assembly 690, a planarizing pad 682 positioned on the table 680, and a planarizing liquid 687 on the planarizing pad 682. The planarizing pad 682 can be a fixed abrasive planarizing pad or, alternatively, the planarizing liquid 687 can be a slurry having a suspension of abrasive elements and the planarizing pad 682 can be a non-abrasive pad. A drive assembly 695 rotates (arrow "G") and/or reciprocates (arrow "H") the platen 680 to move the planarizing pad 682 during planarization.

The carrier assembly 690 controls and protects the microelectronic substrate 110 during planarization. The carrier assembly 690 typically has a substrate holder 692 with a pad 694 that holds the microelectronic substrate 110 via suction. A drive assembly 696 of the carrier assembly 690 typically rotates and/or translates the substrate holder 692 (arrows "I" and "J," respectively). Alternatively, the substrate holder 692 may include a weighted, free-floating disk (not shown) that slides over the planarizing pad 682.

To planarize the microelectronic substrate 110 with the apparatus 660, the carrier assembly 690 presses the microelectronic substrate 110 against a planarizing surface 688 of the planarizing pad 682. The platen 680 and/or the substrate holder 692 then move relative to one another to translate the microelectronic substrate 110 across the planarizing surface 688. As a result, the abrasive particles in the planarizing pad 682 and/or the chemicals in the planarizing liquid 687 remove material from the surface of the microelectronic substrate 110.

The apparatus 660 can also include a current source 621 coupled with leads 628a and 628b to one or more electrode pairs 670 (one of which is shown in FIG. 11). The electrode pairs 670 can be integrated with the platen 680 in generally the same manner with which the electrodes 520a and 520b (FIG. 10) are integrated with the top panel 581 (FIG. 10). Alternatively, the electrode pairs 670 can be integrated with the planarizing pad 682. In either embodiment, the electrode pairs 670 can include electrodes having shapes and configurations generally similar to any of those described above with reference to FIGS. 3-10 to electrolytically remove conductive material from the microelectronic substrate 110. The electrolytic process can be carried out before, during or after the CMP process, as described above with reference to FIG. 9.

FIG. 12A is a schematic circuit representation of some of the components described above with reference to FIG. 10. The circuit analogy can also apply to any of the arrangements described above with reference to FIGS. 3-11. As shown schematically in FIG. 12A, the current source 521 is coupled to the first electrode 520a and the second electrode 520b with leads 528a and 528b respectively. The electrodes 520a and 520b are coupled to the microelectronic substrate 110 with the electrolyte 531 in an arrangement that can be represented schematically by two sets of parallel capacitors and resistors. A third capacitor and resistor schematically indicates that the microelectronic substrate 110 "floats" relative to ground or another potential.

In one aspect of an embodiment shown in FIG. 12A, the current source 521 can be coupled to an amplitude modulator 522 that modulates the signal produced by the current source 521, as is shown in FIG. 12B. Accordingly, the current source 521 can generate a high-frequency wave 804, and the amplitude modulator 522 can superimpose a low-frequency wave 802 on the high-frequency wave 804. For example, the high-frequency wave 804 can include a series of positive or negative voltage spikes contained within a square wave envelope defined by the low-frequency wave 802. Each spike of the high-frequency wave 804 can have a relatively steep rise time slope to transfer charge through the dielectric to the electrolyte, and a more gradual fall time slope. The fall time slope can define a straight line, as indicated by high-frequency wave 804, or a curved line, as indicated by high-frequency wave 804a. In other embodiments, the high-frequency wave 804 and the low-frequency wave 802 can have other shapes depending, for example, on the particular characteristics of the dielectric material and electrolyte adjacent to the electrodes 420, the characteristics of the substrate 110, and/or the target rate at which material is to be removed from the substrate 110.

An advantage of this arrangement is that the high frequency signal can transmit the required electrical energy from the electrodes 520a and 520b to the microelectronic substrate 110, while the low frequency superimposed signal can more effectively promote the electrochemical reaction between the electrolyte 531 and the conductive layer 111 of the microelectronic substrate 110. Accordingly, any of the embodiments described above with reference to FIGS. 3-11 and/or below with reference to FIGS. 13A-16 can include an amplitude modulator in addition to a current source.

Figure 13A:
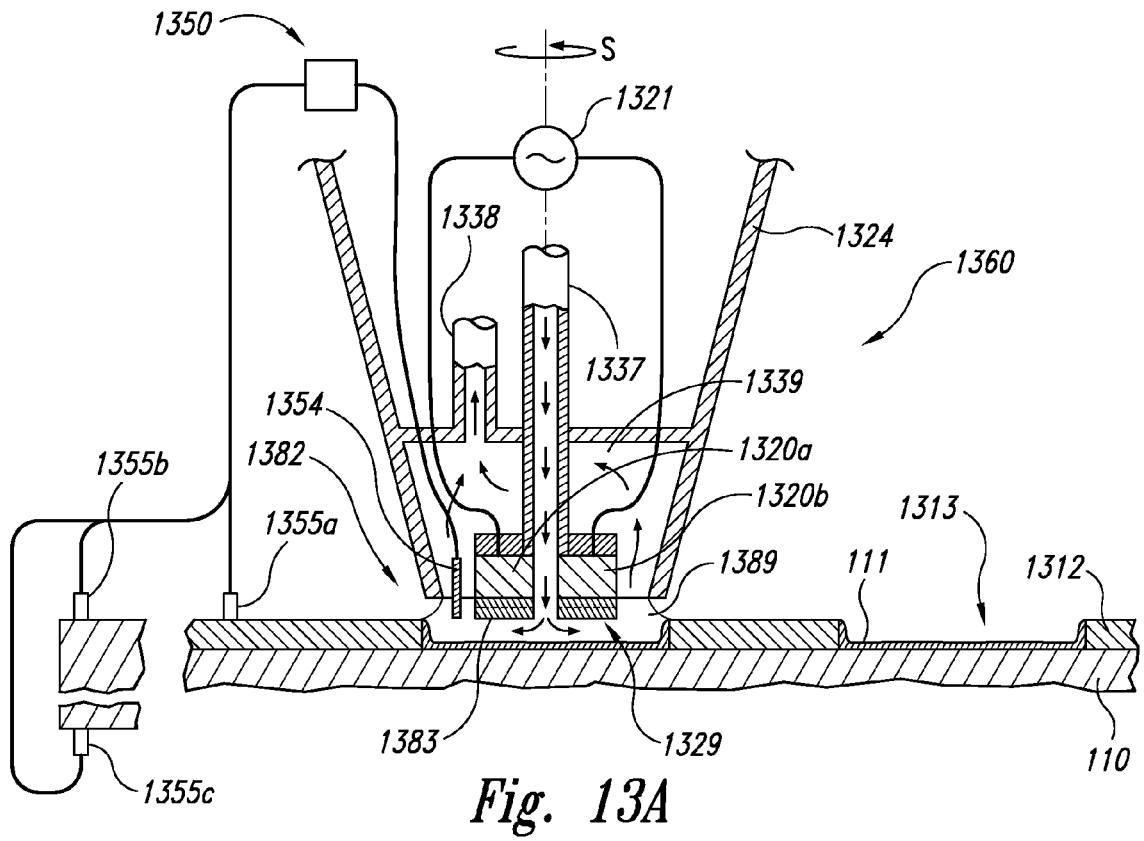
FIG. 13A is a partially schematic, cross-sectional side elevation view of a portion of an apparatus for selectively removing conductive material from a microelectronic substrate in accordance with an embodiment of the invention.

FIG. 13A is a partially schematic, cross-sectional side elevation view of an apparatus 1360 configured to selectively remove conductive material 111 from the microelectronic substrate 110 in accordance with another embodiment of the invention. In one aspect of this embodiment, the apparatus 1360 can deliver an electrolytic liquid 1389 to a local region of the microelectronic substrate 110 and remove the electrolytic liquid 1389 before it spreads to other regions of the microelectronic substrate 110. For example, in one embodiment, the microelectronic substrate 110 can include a substrate material 1312 (such as a borophosphosilicate glass or BPSG) with alignment marks 1313. The alignment marks 1313 are typically used to orient the microelectronic substrate 110 during subsequent processing steps that require the microelectronic substrate 110 to be in a particular orientation. During processing, the alignment marks 1313 can become obscured by the conductive material 111. Accordingly, an embodiment of the apparatus 1360 can be configured to locally remove the conductive material 111 from a region at least proximate to the alignment marks 1313, as described in greater detail below.

In one embodiment, the apparatus 1360 can include an electrode support 1324 that supports a pair of electrodes 1320, including a first electrode 1320a and a second electrode 1320b. The electrodes 1320 can be coupled to a variable electrical signal source 1321, such as an AC current supply. In one aspect of this embodiment, each electrode 1320a, 1320b can have a generally semi-circular planform shape, and in other embodiments, the electrodes 1320 can have other shapes. For example, the electrodes 1320a, 1320b can each have a square shape or a rectangular shape. The particular shape of the electrodes 1320a, 1320b can be selected based on the shape of the region from which the conductive material 111 is to be removed. In still further embodiments, the apparatus 1360 can include more than one pair of electrodes 1320, with each pair of electrodes 1320 selectively or sequentially energized to remove the conductive material 111 in a particular pattern or manner.

The apparatus 1360 can further include a dielectric material 1329 positioned between the electrodes 1320 and the microelectronic substrate 110. In one embodiment, the dielectric material 1329 can be positioned to contact the microelectronic substrate 110. In one aspect of this embodiment, the dielectric material 1329 can include one or more polishing pad portions 1383 that define in part a polishing medium 1382 and that are configured to physically remove material from the microelectronic substrate 110 when at least one of the electrode support 1324 and the microelectronic substrate 110 moves relative to the other. For example, the electrode support 1324 can rotate about a central axis (as indicated by arrow "S") to aid in the removal of the conductive material 111 from the microelectronic substrate 110. In other embodiments, the dielectric material 1329 can be spaced apart from the microelectronic substrate 110. In either of these embodiments, the dielectric material 1329 can provide for separation between the electrodes 1320 and the microelectronic substrate 110 and can allow the electrolytic liquid 1389 to be in fluid and electrical communication with both the microelectronic substrate 110 and the electrodes 1320. In a further aspect of these embodiments, the dielectric material 1329 can be releasably attached to the electrodes 1320 and can accordingly be removed and replaced, for example, when the dielectric material 1329 becomes worn. In one embodiment, the dielectric material 1329 can include polishing pad portions 1383 that are releasably connected to the electrodes 1320 with an adhesive. In other embodiments, the polishing pad portions 1383 can be connected to the electrodes 1320 with other arrangements.

In any of the foregoing embodiments, the electrolytic liquid 1389 can be provided to the surface of the microelectronic substrate 110 through a first flow passage, such as a delivery flow passage 1337, positioned in the electrode support 1324. The electrode support 1324 can also include a second flow passage, such as a withdrawal flow passage 1338. In one aspect of this embodiment, the withdrawal flow passage 1338 includes a collection plenum 1339 disposed annularly around the delivery flow passage 1337 and coupled to a low pressure device, such as a vacuum pump or venturi. In other embodiments, the withdrawal flow passage 1338 can have other arrangements. In any of these embodiments, the electrolytic liquid 1389 can flow through the delivery flow passage 1337 to the interface region between the electrodes 1320 and the microelectronic substrate 110, and then away from the interface region through the withdrawal flow passage 1338.

The apparatus 1360 can also include a sensor assembly 1350. In one embodiment, the sensor assembly 1350 can include a signal transmitter and detector coupled to one or more sensor electrodes to transmit a sensor signal and detect characteristics of the sensor signal representative of the condition of the microelectronic substrate 110. For example, the sensor assembly can include a first sensor electrode 1354 positioned in the interface region between the electrodes 1320 and the microelectronic substrate 110. The sensor assembly 1350 can further include one or more second sensor electrodes positioned in electrical communication with the microelectronic substrate 110 to complete the circuit provided by the first sensor electrode 1354. For example, the sensor assembly 1350 can include a second sensor electrode 1355*a* connected directly to the microelectronic substrate 110 proximate to the interface region. This arrangement is suitable when the substrate material 1312 is electrically conductive. In an alternative embodiment, a second sensor electrode 1355*b* can be coupled to the microelectronic substrate 110 remote from the interface region but at a location that is in electrical communication with the conductive material 111. In still a further embodiment, a second sensor electrode 1355*c* can be connected to an oppositely facing surface of the microelectronic substrate 110 which is also in electrical communication with the conductive material 111. In any of these embodiments, the sensor assembly 1350 can detect characteristics of the transmitted electrical signal that indicate a condition of the microelectronic substrate 110, such as whether any of the conductive material 111 to be removed remains on the microelectronic substrate 110.

Figure 13B:
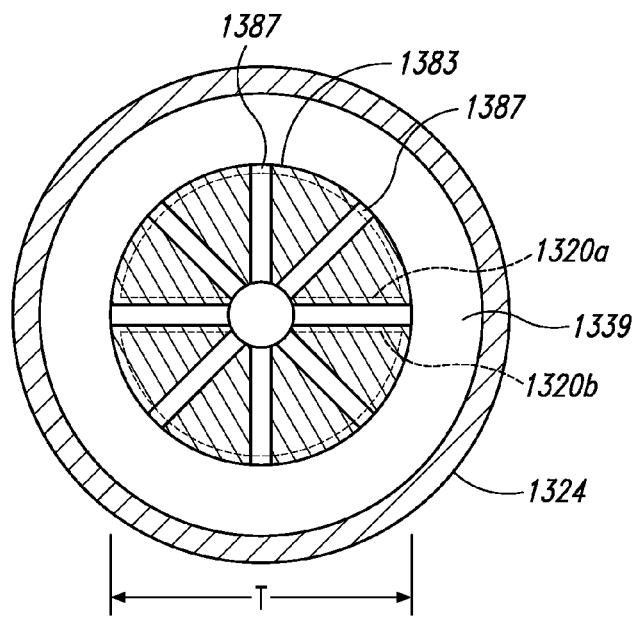
FIG. 13B is a bottom view of an embodiment of the apparatus shown in FIG. 13A.

FIG. 13B is a bottom view of an embodiment of the electrode support 1324 described above with reference to FIG. 13A. In one aspect of this embodiment, the electrodes 1320*a*, 1320*b* can have a generally semicircular shape, as described above. In another aspect of this embodiment, a single polishing pad portion 1383 can be positioned over both the electrodes 1320*a*, 1320*b*. In still a further aspect of this embodiment, the polishing pad portion 1383 can include a plurality of grooves 1387 that allow the electrolytic liquid 1389 (FIG. 13A) to flow outwardly from the delivery flow passage 1337 to the collection chamber 1339. In other embodiments, the electrode support 1324 can include other arrangements for delivering and withdrawing the electrolytic liquid 1389.

In a further aspect of an embodiment of the apparatus 1360 shown in FIG. 13B, a pair of electrodes 1320 can have a major axis (such as a diameter) with a length "T." The length T can be selected based on the size of the region from which the conductive material 111 is to be removed. For example, the length T can range from about 50 microns to about 5000 microns. In one particular embodiment, T can be approximately equal to the width of the alignment marks 1313 (FIG. 13A). In another embodiment, the length T can be less than the width of the alignment marks 1313 so that the electrodes 1320*a*, 1320*b* fit into the grooves defined by the alignment marks 1313. In still another embodiment, the length T can be greater than the width of the alignment marks 1313, for example, to ensure that all the conductive material 111 within the alignment marks 1313 is exposed to the electrolytic liquid 1389.

One feature of an embodiment of the apparatus 1360 described above with reference to FIGS. 13A-13B is that the electrode support 1324 can deliver the electrolytic liquid 1389 locally to a particular region of the microelectronic substrate 110, and can withdraw the electrolytic liquid 1389 before it spreads over the entire microelectronic substrate 110. An advantage of this arrangement is that the conductive material 111 can be removed from selected regions of the microelectronic substrate 110 without removing the conductive material 111 from other regions. For example, the conductive material 111 can be removed from the region at least proximate to the alignment marks 1313 (to make the alignment marks 1313 more accessible to detection equipment in subsequent steps) without removing conductive material 111 from other portions of the microelectronic substrate 110.

Another feature of an embodiment of the apparatus 1360 described above with reference to FIGS. 13A-13B is that the electrodes 1320*a*, 1320*b* can remove the conductive material 111 by electrolytic action alone, or by chemical-electrolytic action for example, when the dielectric material 1329 does not include polishing pad portions 1383. Accordingly, the apparatus 1360 need not apply a large downforce (or any downforce) to the microelectronic substrate 110 in order to selectively remove the conductive material 111. An advantage of this arrangement is that the apparatus 1360 and its operation can be relatively simple. A further advantage is that the potential for damaging structures of the microelectronic substrate 110 by applying high downforces can be reduced and/or eliminated. In another embodiment, the electrolytic material 1329 can include polishing pad portions 1383 that remove material from the microelectronic substrate 110 by mechanical action. An advantage of this arrangement is that the polishing pad portions 1383 can increase the rate at which material is removed in applications where applying a downforce does not unacceptably stress the microelectronic substrate 110.

In a further embodiment, the electrolytic liquid 1389 can be selected to be generally nonreactive with the conductive material 111 and/or other features of the microelectronic substrate 110 unless an electrical current is passing through the electrolytic liquid 1389. For example, the electrolytic liquid 1389 can be selected to include hydrochloric acid, sulfuric acid, or phosphoric acid, which are generally nonreactive or inert with respect to selected conductive materials 111, such as platinum and copper, unless an electrical current (or an electrical current above a particular level) is passing through the electrolytic liquid 1389. In another embodiment, the electrolytic liquid 1389 can include other acids and can have a pH of less than about 4. In still another embodiment, the electrolytic liquid 1389 can include a base (such as ammonia, potassium hydroxide, or TMAH) and can have a pH of greater than about 10. In any of these embodiments, the acid or base can in some cases provide the ions required for electrolytically removing the conductive material 111 from the microelectronic substrate 110. In other cases (for example, when the base includes ammonia) the electrolytic liquid 1389 can include an additional electrolyte, such as ammonium phosphate.

In other embodiments, the electrolytic liquid 1389 can remove conductive material from the microelectronic substrate 110 without the application of electrical current, but at such a slow rate as to have no detrimental effect on the microelectronic substrate 110. For example, acids or bases in the electrolytic liquid 1389 can readily remove the thin oxide coating that typically forms adjacent to a copper or platinum layer, but can remove the underlying elemental metal only at very slow rates in the absence of an oxidizing agent. Accordingly, the electrolytic liquid 1389 can be selected not to include oxidizing agents (such as hydrogen peroxide, ferric chloride or ferric nitrate). The oxidizing function is instead provided by the variable electrical current, which is selectively passed through the electrolytic liquid 1389 to remove conductive materials only in close proximity to the electrodes 1320.

An advantage of the foregoing nonreactive or less reactive electrolytic liquids 1389 is that even if some of the electrolytic liquid 1389 escapes from the interface region between the electrodes 1320a, 1320b and the microelectronic substrate 110, the electrolytic liquid 1389 will not have a detrimental effect on other portions of the microelectronic substrate 110 with which it may come into contact. Therefore, electrolytic liquids 1389 of this nature may be used in combination with other apparatuses in addition to the apparatus 1360 described above. For example, such electrolytic liquids 1389 can be used with apparatuses generally similar to those described above with reference to FIGS. 3-5, which can also remove material from a local region of the microelectronic substrate 110 without necessarily removing material from the entire substrate 110.

In a method in accordance with one embodiment of the invention, the electrodes 1320 can be stationary relative to the microelectronic substrate 110 while removing the conductive material 111. In another embodiment, the electrodes 1320 can rotate, as described above with reference to FIG. 13B. In still another embodiment, the electrodes 1320 and/or the microelectronic substrate 110 can move to reposition the electrodes 1320 relative to the microelectronic substrate 110, during the removal process and/or after conductive material 111 has been removed from a particular location. As the electrodes 1320 pass over regions of the microelectronic substrate 110 from which the conductive material 111 is not to be removed, the current applied to the electrodes 1320 can be reduced or halted. An advantage of any of these embodiments is that the conductive material 111 can be selectively removed from one or more local regions of the microelectronic substrate 110.

In yet another embodiment, the flow through the second (withdrawal) flow passage 1338 can be reversed. For example, a diluting liquid such as deionized water, can be provided through the second flow passage 1338 to dilute the electrolytic liquid 1389 flowing radially outwardly from the first (delivery) flow passage 1337. Accordingly, the electrolytic liquid 1389 can include chemically reactive constituents and can be provided through the first flow passage 1337 to the interface region, where the electrolytic liquid 1389 chemically and electrolytically removes material from the microelectronic substrate 110. As the electrolytic liquid 1389 moves away from the electrodes and the electrode support 1324, it is diluted by liquid flowing toward the microelectronic substrate 110 through the second flow passage 1338. In one aspect of this embodiment, the electrolytic fluid 1389 can be provided at a higher pressure than the diluting liquid so that the diluting liquid does not flow radially inwardly to reduce the chemical and/or electrolytic effectiveness of the electrolytic liquid. Instead, the electrolytic liquid 1389 is diluted as it flows away from the electrode support 1324 so that the electrolytic liquid 1389 tends to remove material from the microelectronic substrate 110 only in an interface region proximate to the electrode support 1324.

Figure 14:
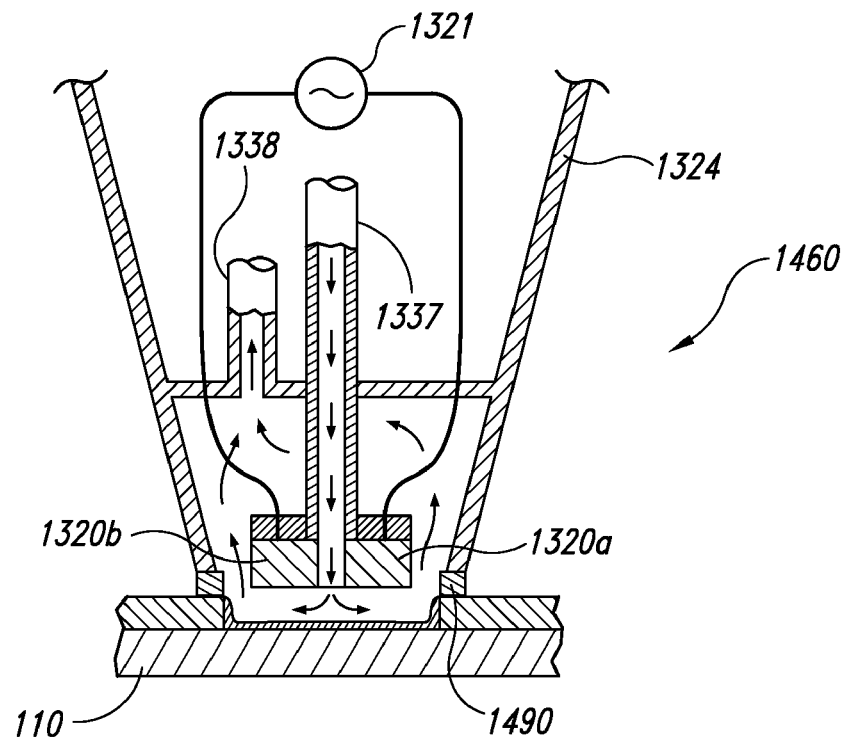
FIG. 14 is a partially schematic, cross-sectional side elevation view of an apparatus for selectively removing conductive material in accordance with another embodiment of the invention.

FIG. 14 is a partially schematic, cross-sectional side elevation view of an apparatus 1460 that includes a flow restrictor, such as a seal 1490 disposed annularly around the electrodes 1320a, 1320b. In one aspect of this embodiment, the electrodes 1320a, 1320b do not include a dielectric material 1329 (FIG. 13A). In another embodiment, the electrodes 1320a, 1320b can include a dielectric material 1329, which can in turn include the polishing pad portions 1383 (FIG. 13A). In either embodiment, the annular seal 1490 can restrict and/or prevent the electrolytic liquid 1389 from passing outwardly away from the electrodes 1320 and away from the interface region. Accordingly, the seal 1490 can be configured to contact the microelectronic substrate 110 or come so close to the microelectronic substrate 110 as to restrict and/or prevent the outward flow of the electrolytic liquid 1389. In one aspect of this embodiment, the seal 1490 can have a generally flat surface facing toward the microelectronic substrate 110. In another embodiment, the seal 1490 can have a ridged surface that forms a series of baffles to further restrict the motion of the fluid 1389 outwardly from the electrodes 1320.

Figure 15A:
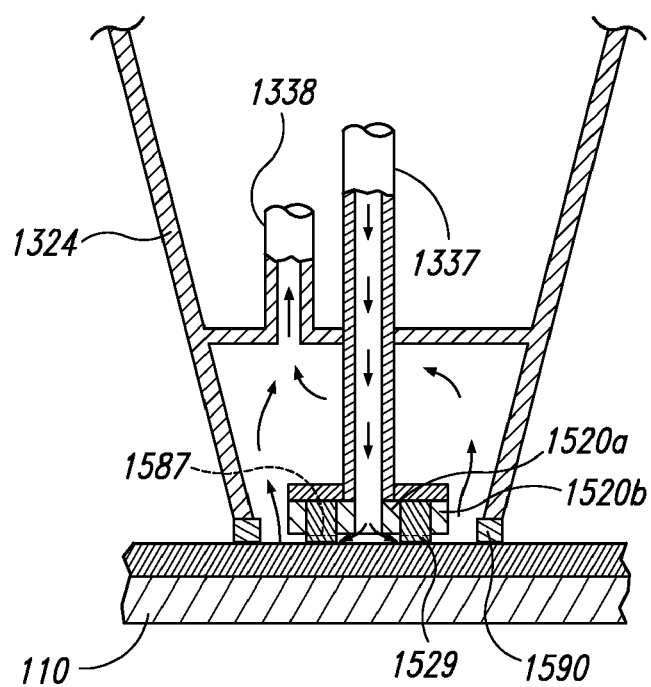
FIG. 15A is a partially schematic, cross-sectional side elevation view of an apparatus having annular electrodes for selectively removing material from a microelectronic substrate in accordance with yet another embodiment of the invention.

FIG. 15A is a partially schematic, cross-sectional side elevation view of an apparatus 1560 having an electrode support 1324 that supports annularly disposed electrodes 1520 (shown as a first electrode 1520a and a second electrode 1520b) in accordance with another embodiment of the invention. In one aspect of this embodiment, the first electrode 1520a is ring-shaped and is disposed outwardly from the delivery flow passage 1337. The second electrode 1520a can also be ring-shaped and can be disposed annularly outwardly from the first electrode 1520a. A ring-shaped dielectric material 1529 can be positioned annularly between the first electrode 1520a and the second electrode 1520b. The electrolytic liquid 1389 can flow annularly outwardly from the first electrode 1520a through grooves 1587 in the dielectric material 1529 to the second electrode 1520b, and then upwardly into the collection chamber 1339 and out through the withdrawal flow passage 1338. The apparatus 1560 can further include an annular seal 1590 positioned around the electrodes 1520 to at least restrict the outward flow of the electrolytic liquid 1389 in a manner generally similar to that described above with reference to FIG. 14.

Figure 15B:
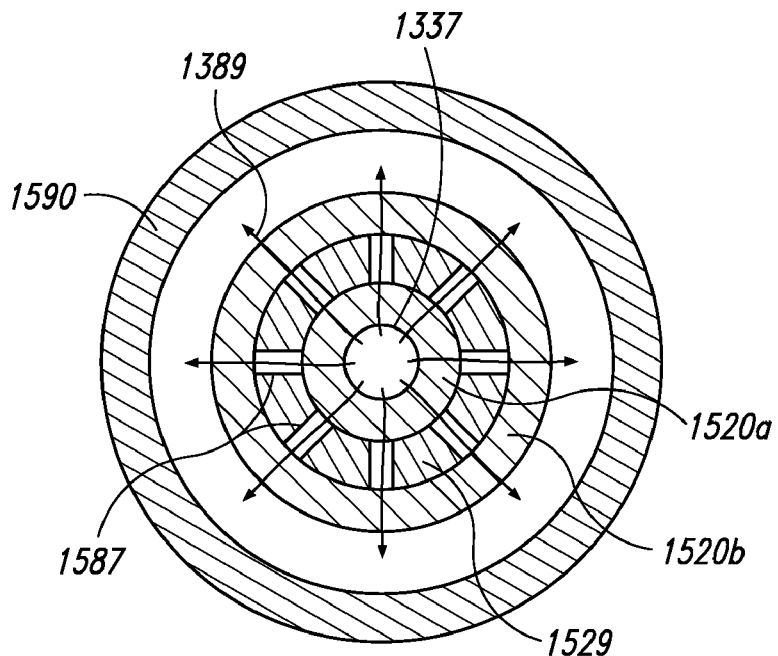
FIG. 15B is a bottom view of an embodiment of the apparatus shown in FIG. 15A.

FIG. 15B is a bottom view of an embodiment of the apparatus 1560 described above with reference to FIG. 15A. As shown by arrows in FIG. 15B, the electrolytic liquid 1389 can flow radially outwardly through the grooves 1587 in the dielectric material 1529 toward the collection chamber 1339. The dielectric material 1529 can contact the microelectronic substrate 110 (FIG. 15A) or can be spaced apart from the microelectronic substrate 110, as was generally described above with reference to FIGS. 13A and 13B.

Figure 15C:
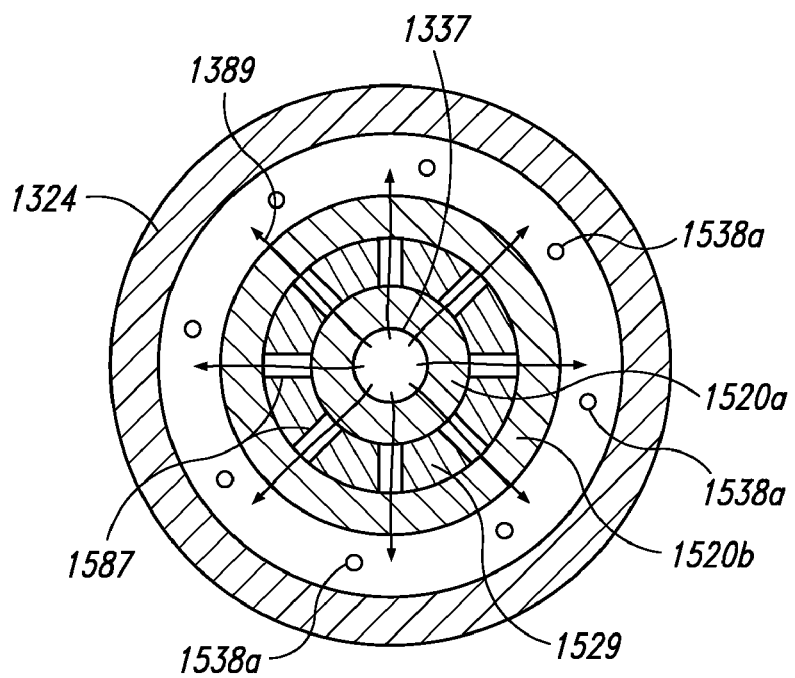
FIG. 15C is a bottom view of an apparatus having multiple withdrawal flow passages in accordance with another embodiment of the invention.

FIG. 15C is a bottom view of an embodiment of the apparatus 1560 having a plurality discrete withdrawal flow passages 1538a. In one aspect of this embodiment, the withdrawal flow passages 1538a can be disposed radially outwardly from the first and second electrodes 1520a, 1520b and can each be configured to withdraw a portion of the electrolytic liquid 1389 flowing radially outwardly from the delivery flow passage 1337. Each flow passage 1538a can be coupled to the collection chamber 1339 (FIG. 15B), which can in turn be coupled to a vacuum source, as described above.

Figure 16:
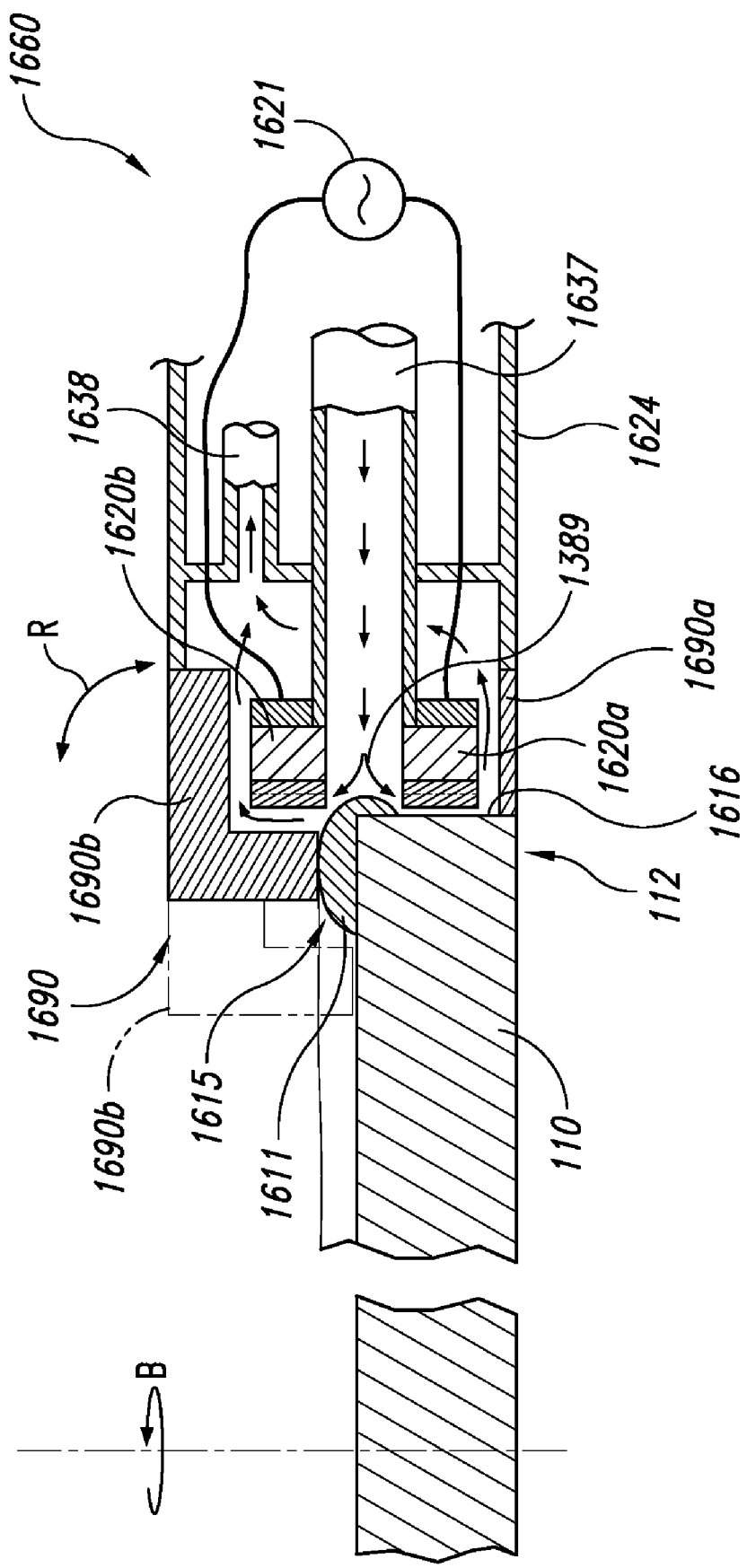
FIG. 16 is a partially schematic, cross-sectional side elevation view of a portion of an apparatus for removing conductive material from a peripheral region of a microelectronic substrate in accordance with still another embodiment of the invention.

FIG. 16 is a partially schematic, cross-sectional side view of an apparatus 1660 configured to remove conductive material from the peripheral region 112 of the microelectronic substrate 110 in accordance with another embodiment of the invention. In one aspect of this embodiment, the microelectronic substrate 110 can include an edge bead 1615 of conductive material 1611 (which may tend to form during the course of typical processing steps), and the apparatus 1660 can be configured to remove some or all of the bead 1615. For example, the apparatus 1660 can support the microelectronic substrate 110 with the edge bead 1615 in a material removal region. The apparatus 1660 can include an electrode support 1624 configured to position electrodes 1620 (shown as a first electrode 1620a and a second electrode 1620b) in close proximity to the bead 1615. In a further aspect of this embodiment, the electrode support 1624 can include a delivery flow passage 1637 that provides an electrolytic liquid 1389 to the microelectronic substrate 110, a withdrawal flow passage 1638 that removes the electrolytic liquid 1389, and an annular seal 1690 configured to at least restrict the flow of the electrolytic liquid 1389 away from the electrodes 1620.

In a further aspect of this embodiment, the seal 1690 can include a first portion 1690a configured to form a seal or partial seal with an edge surface 1616 of the microelectronic substrate 110. The seal 1690 can further include a second portion 1690b configured to form a seal or partial seal with the bead 1615. In one aspect of this embodiment, the second portion 1690b can have abrasive characteristics to abrade the conductive material 1611 from the bead 1615. In a further aspect of this embodiment, the electrode support 1624 can rotate during processing (as indicated by arrow "R") to more completely remove the bead 1615. In another embodiment, the second portion 1690b can extend radially inwardly of the bead 1615 (as shown in dashed lines in FIG. 16) to more completely expose the bead 1615 to the electrolytic liquid 1389 without requiring the apparatus 1660 to be tilted as indicated by arrow R. In either embodiment, the microelectronic substrate 110 can rotate relative to the apparatus 1660 (as indicated by arrow B) to allow successive portions of the bead 1615 to be exposed to the electrodes 1620 for removal.

In another embodiment, the electrodes 1620 can be orbited around the microelectronic substrate 110 to achieve the same result.

One feature of an embodiment of the apparatus 1660 described above with reference to FIG. 16 is that the electrode support 1624 can direct the electrolytic liquid 1389 locally to the edge of the microelectronic substrate 110. An advantage of this feature is that locally deposited conductive material (such as the bead 1615) can be removed from the microelectronic substrate 110 without adversely affecting conductive materials on other portions of the microelectronic substrate 110. As described above with reference to FIG. 13, this effect can be further enhanced by selecting the electrolytic liquid 1389 to be generally nonreactive with features of the microelectronic substrate 110 unless an electrical current is passing through the liquid in a local region. A further advantage of this feature is that conductive material can be removed from the edge of the microelectronic substrate 110. This conductive material might otherwise flake off and contaminate other portions of the microelectronic workpiece 110.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for removing a conductive material from a microelectronic substrate, comprising:
    positioning a microelectronic substrate proximate to and spaced apart from an electrode pair that includes a first electrode and a second electrode spaced apart from the first electrode;
    directing an electrolytic liquid through a first flow passage and between the microelectronic substrate and the electrode pair;
    passing a varying electrical signal through the electrode pair and the electrolytic liquid to remove conductive material from the microelectronic substrate; and
    removing the electrolytic liquid from between the microelectronic substrate and the electrode pair through a second flow passage proximate the first flow passage.

2. The method of claim 1 wherein disposing an electrolytic liquid includes disposing an electrolytic liquid that is inert relative to the conductive material when no electrical signal passes through the electrolytic liquid.

3. The method of claim 1 wherein disposing an electrolytic liquid includes disposing an electrolytic liquid that includes at least one of hydrochloric acid, sulfuric acid, phosphoric acid, ammonia, potassium hydroxide or TMAH.

* * * * *